（12）United States Patent
Sathish et al.

(10) Patent No.: US 10,241,994 B2
(45) Date of Patent: Mar. 26, 2019

(54) ELECTRONIC DEVICE AND METHOD FOR PROVIDING CONTENT ON ELECTRONIC DEVICE

(71) Applicant: SAMSUNG ELECTRONICS CO., LTD., Suwon-si (KR)

(72) Inventors: Sailesh Kumar Sathish, Bangalore (IN); Anish Anil Patankar, Karnataka (IN); Nirmesh Neema, Udapura (IN); Swetha Mysore Jagadeesha, Mysore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 532 days.

(21) Appl. No.: 14/790,803

(22) Filed: Jul. 2, 2015

(65) Prior Publication Data

US 2016/0004779 A1 Jan. 7, 2016

(30) Foreign Application Priority Data

Jul. 2, 2014 (IN) ............................ 3260/CHE/2014
Dec. 5, 2014 (IN) ............................ 3260/CHE/2014
Jun. 29, 2015 (KR) ........................ 10-2015-0092564

(51) Int. Cl.
*G06F 17/00* (2006.01)
*G06F 17/30* (2006.01)
*G06F 17/27* (2006.01)

(52) U.S. Cl.
CPC .... *G06F 17/2705* (2013.01); *G06F 17/30731* (2013.01); *G06F 17/30864* (2013.01)

(58) Field of Classification Search
CPC ..................... G06F 17/30864; G06F 17/30731
See application file for complete search history.

(56) References Cited

U.S. PATENT DOCUMENTS

| 8,484,187 | B1 * | 7/2013 | Hong ................ G06F 17/30554 707/706 |
| 8,645,390 | B1 * | 2/2014 | Oztekin ............ G06F 17/30867 707/721 |
| 2009/0055359 | A1 | 2/2009 | Gross |
| 2010/0153210 | A1 | 6/2010 | Oh et al. |
| 2012/0317089 | A1 * | 12/2012 | Randall ............ G06F 17/30864 707/709 |
| 2013/0238989 | A1 | 9/2013 | Chu |

(Continued)

FOREIGN PATENT DOCUMENTS

KR  1020090033149 A  4/2009
KR  1020110059257 A  6/2011

OTHER PUBLICATIONS

Communication dated Sep. 23, 2015, issued by the International Searching Authority in counterpart International Application No. PCT/KR2015/006828 (PCT/ISA/210).

(Continued)

*Primary Examiner* — Cheryl Lewis
(74) *Attorney, Agent, or Firm* — Sughrue Mion, PLLC

(57) ABSTRACT

An electronic device and a method for providing content on the electronic device are provided. The method includes receiving webpages from information sources, extracting intent data related to an object in the webpages, transmitting the extracted intent data to a server, and receiving, from the server, a content list including a content index that is determined based on the transmitted intent data.

25 Claims, 17 Drawing Sheets

(56) References Cited

U.S. PATENT DOCUMENTS

2013/0282693 A1  10/2013  Wang et al.
2016/0210360 A9* 7/2016  Stouffer ............ G06F 17/30864

OTHER PUBLICATIONS

Communication dated Oct. 19, 2017 issued by the European Patent Office in counterpart Application No. 15815020.1.
Hiroshi Tsuda et al., "WorkWare: WWW-based Chronological Document Organizer", Fujitsu Laboratories Ltd., Jul. 15, 1998, pp. 1-6, XP-002175763.
Nawei Chen "A Survey of Indexing and Retrieval of Multimodal Documents: Text and Images", Technical Report 2006-505, Feb. 2006, 40 pages total, XP-007900811.

* cited by examiner

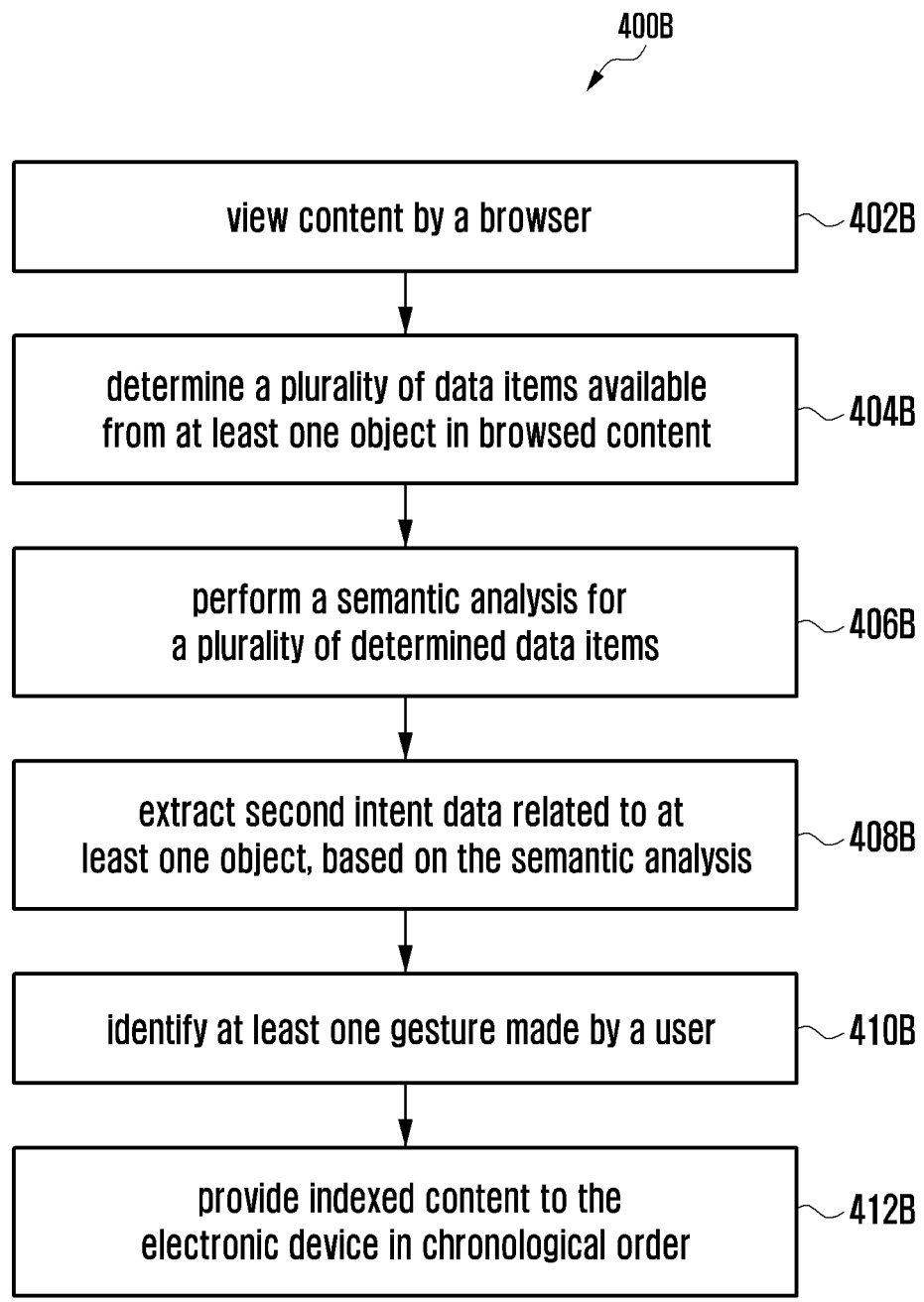

FIG. 5

| Express India | Times Of India | BBC.com | Nyt.com |
|---|---|---|---|
| Elections declared | Elections Announced | India elections announced | |
| Last day of campaign | Campaign ends | Indian campaign ends | |
| BJP in lead | Election results out | Single party majority in India | India election results expected |
| BJP Majority | BJP in landslide | India's BJP to power | Incumbent leader loses |
| | Modi as PM | | Saffron party: Profile |
| Modi Sworn in | | BJP Govt. Sworn in | India's new govt. |

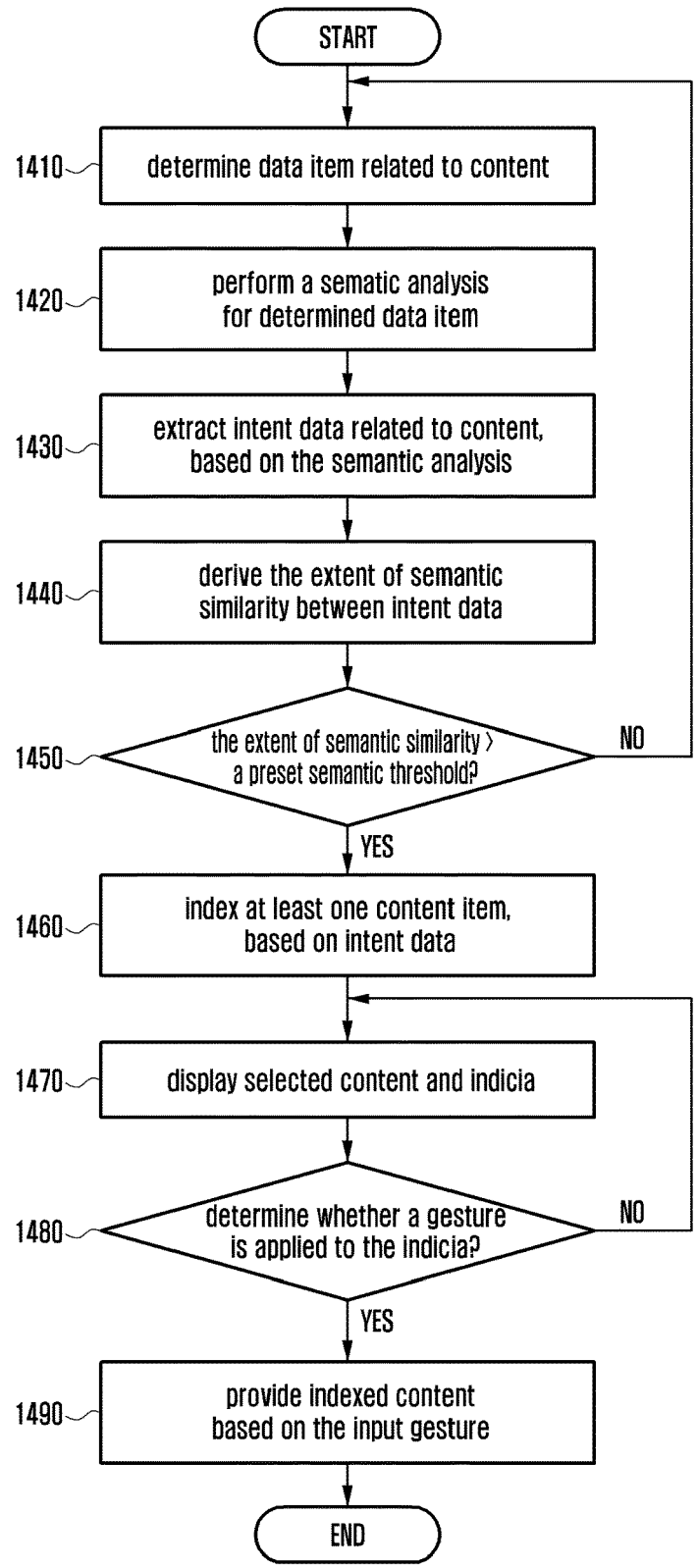

ELECTRONIC DEVICE AND METHOD FOR PROVIDING CONTENT ON ELECTRONIC DEVICE

CROSS-REFERENCE TO RELATED APPLICATIONS

This application claims priority from Indian Provisional Application No. 3260/CHE/2014, filed on Jul. 2, 2014, in the Indian Patent Office, Indian Non-Provisional Application No. 3260/CHE/2014, filed on Dec. 5, 2014, in the Indian Patent Office, and Korean Patent Application No. 10-2015-0092564, filed on Jun. 29, 2015, in the Korean Intellectual Property Office, the disclosures of which are incorporated herein by reference in their entireties.

BACKGROUND

1. Field

Apparatuses and methods consistent with exemplary embodiments relate to an electronic device and a method for providing content on the electronic device.

2. Description of the Related Art

As the Internet has grown rapidly, a great amount of information can be obtained over the Internet. Users browse the Internet as sources to obtain information about events and topics that differ from each other.

When a user searches for a topic over the Internet, a search engine may create results for searching topics. Because a search engine searches for content, based on technologies such as keyword indexing and rankings, by using crawlers, it can provide related content to users.

Similarly, when a user searches for information related to news and events at the present time, he/she may receive corresponding information from the news service provider. In general, a news service provider receives breaking news headlines from a content provider, and also stores related to the breaking news from a plurality of content providers. After that, the news service provider may put the breaking news headlines and information related to the breaking news together, and may provide the composited content to users. Because the related information is searched based on keywords, the searched content shown to users may be incomplete, and the data/depth may be insufficient or irrelative. Because the provided, related information items are not arranged in chronological order, users may determine the correct order of events in the news event, referring to respective results.

Providers that provide information and news services, such as search engines, have not been equipped with a capability of semantically correlating content. Because information provided to users is based on keyword matching, the probability of providing irrelative content increases. This content may be provided to users in a non-organized fashion. For news events, users may need to manually search for the origins, referring to a plurality of content providers, or to fetch completed context for the news stories. For searched topics, users may need to refer to a plurality of results to understand the search topics.

Therefore, providing semantically related information to users may allow the users to easily search for and understand content.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide an electronic device with content that is semantically related to an object that is browsed by a user.

According to an aspect of an exemplary embodiment, there is provided a content providing method of an electronic device, the method including receiving webpages from information sources, extracting intent data related to an object in the webpages, transmitting the extracted intent data to a server, and receiving, from the server, a content list including a content index that is determined based on the transmitted intent data.

The content index may include an address of webpages for an information source.

The content list may include at least one among the following: an index number for related content, a URL of the related content, a summary of the related content, an extent of semantic similarity between the related content and content corresponding to the object, domain metadata, metadata of the related content, and an image representing the related content.

The intent data may include at least one among the following: metadata of the object, content corresponding to the object, and context data about objects.

The metadata may include at least one among the following: a creation date, a title, an author, and domain information of the content.

The extracting may include determining data items available from the object, performing a semantic analysis for the determined data items, and extracting the intent data related to the object, based on the performing the semantic analysis.

The data items may include at least one among the following: a topic, an event, a subject, content, a word vector, a token, and context information, which are related to the object.

The word vector may include information of a probability distribution that is determined as words related to the object are distributed with respect to at least one topic.

The method may further include determining whether there is content related to objects in webpages that are displayed, based on the received content list, displaying objects along with indicia indicating that there is the related content, based on the determining that there is the related content, receiving an input that selects an index among the displayed indicia, and providing content related to an object corresponding to the selected index.

The providing may include receiving, from the information sources, webpages for the content related to the object corresponding to the selected index, and displaying the webpages.

The method may further include providing related content that is related to the object corresponding to the selected index, in chronological order.

According to an aspect of another exemplary embodiment, there is provided a content providing method of an electronic device, the method including receiving intent data for content from an external electronic device, creating a content list including a content index for other content that is related to the content, based on the received intent data, and transmitting the created content list to the external electronic device.

The content list may include at least one among the following: an index number for the other content, a URL of the other content, a summary of the other content, an extent of semantic similarity between the other content and the content, domain metadata, metadata of the other content, and an image representing the other content.

The creating may include indexing the other content in chronological order.

According to an aspect of another exemplary embodiment, there is provided an electronic device including an interface configured to receive webpages from information sources, and a processor configured to extract intent data related to an object in the webpages. The interface may be further configured to transmit the extracted intent data to a server, and receive, from the server, a content list including a content index that is determined based on the transmitted intent data.

The processor may be further configured to determine data items available from the object, perform a semantic analysis for the determined data items, and extract the intent data related to the object, based on the processor performing the semantic analysis.

The processor may be further configured to determine whether there is content related to objects in webpages that are displayed, based on the received content list, control a display to display objects along with indicia indicating that there is the related content, based on the processor determining that there is the related content, receive an input that selects an index among the displayed indicia, and provide content related to an object corresponding to the selected index.

The processor may be further configured to receive, from the information sources, webpages for the content related to the object corresponding to the selected index, and control the display to display the webpages.

The processor may be further configured to provide related content that is related to the object corresponding to the selected index, in chronological order.

According to an aspect of another exemplary embodiment, there is provided an electronic device including an interface configured to receive intent data for content from an external electronic device, and a processor configured to create a content list including a content index for other content that is related to the content, based on the received intent data. The interface may be further configured to transmit the created content list to the external electronic device.

The processor may be further configured to index the other content in chronological order.

According to an aspect of another exemplary embodiment, there is provided a content providing method of an electronic device, the method including determining a data item related to content, performing a semantic analysis on the data item, extracting intent data related to the content, based on the performing the semantic analysis, determining whether an extent of semantic similarity between the intent data is greater than a threshold, and indexing the content based on the intent data, in response to the determining that the extent of semantic similarity is greater than a threshold.

The method may further include displaying content that is selected by a user, and indicia that indicates that there is the indexed content, receiving an input that selects an index among the indicia, and providing the indexed content based on the input.

BRIEF DESCRIPTION OF THE DRAWINGS

The above and/or other aspects will be more apparent by describing exemplary embodiments with reference to the accompanying drawings in which:

FIG. 4B is a flowchart of a method of providing indexed content on an electronic device, according to an exemplary embodiment;

FIG. 5 is a diagram of a sparse semantic matrix showing information from a plurality of information sources, according to an exemplary embodiment;

FIG. 14 is a flowchart of a content providing method of an electronic device, according to an exemplary embodiment.

DETAILED DESCRIPTION OF THE EXEMPLARY EMBODIMENTS

Figure 1A:
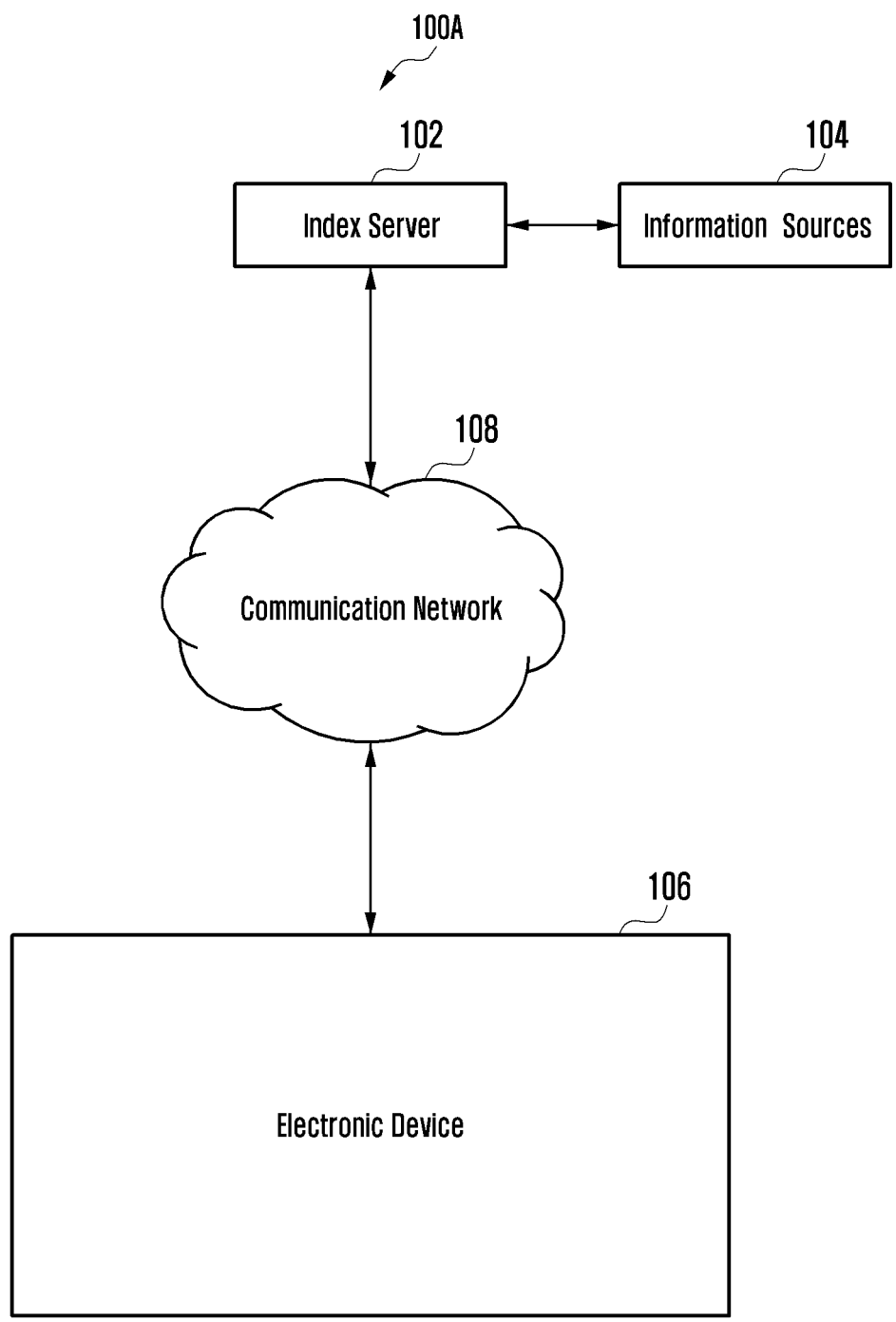
FIGS. 1A to 1C are schematic block diagrams of a system for providing semantically indexed content to an electronic device, according to exemplary embodiments.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

It will be understood that the terms such as "unit," "-er (-or)," and "module" described in the specification refer to an element for performing at least one function or operation, and may be implemented in hardware, software, or the combination of hardware and software.

Exemplary embodiments achieve a system and method for organizing content on an electronic device. The method includes a process of extracting first intent data related to content data received from a plurality of information sources. The first intent data is extracted by performing a semantic analysis for content received from a plurality of information sources. The method includes a process of dynamically indexing content received from a plurality of sources based on the first intent data, according to the semantic similarity between a plurality of data items related to content received from respective information sources. The method includes a process of extracting second intent data related to at least one object browsed by a user, from the electronic device related to the user. The method includes a process of providing content indexed in chronological order, on the electronic device of a user, based on the availability of indexed content related to second intent data and a user gesture.

Exemplary embodiments achieve a system and method for providing content to an electronic device. The method includes a process of extracting intent data related to at least one object browsed by a user. The intent data is extracted by performing a semantic analysis for objects. The method includes a process of dynamically indexing content based on extracted intent data. The indexed content is related to objects in chronological order. The method includes a process of providing indexed content to an electronic device, based on at least one user gesture.

The system and method are robust to dynamically organized content in an electronic device such as a server. Because indexing content in a server is performed based on the extent of semantic similarity between data items of content received from a plurality of information sources, the system and method provide semantically linked content with a relatively high precision. The server determines semantic linkage between content items, and includes a semantic threshold for guaranteeing that indexed content items have been linked to each other. Because the indexed content is arranged in chronological order, when content is provided to an electronic device, the electronic device user can identify the origin of the content. For example, for a news story, the user of an electronic device can easily find out a location about the origin of the news story, based on content provided in chronological order. In addition, content may be provided to an electronic device of a user, based on the availability of indexed content and acted user gestures. For example, a top-to-bottom swipe for indicia makes it possible for a user to search for previous content related to content that the user is viewing. As another example, content availability indicia may be populated on a webpage, based on available indexed content.

In the description, the terms 'server' and 'index server' are interchangeably used.

Figure 1B:
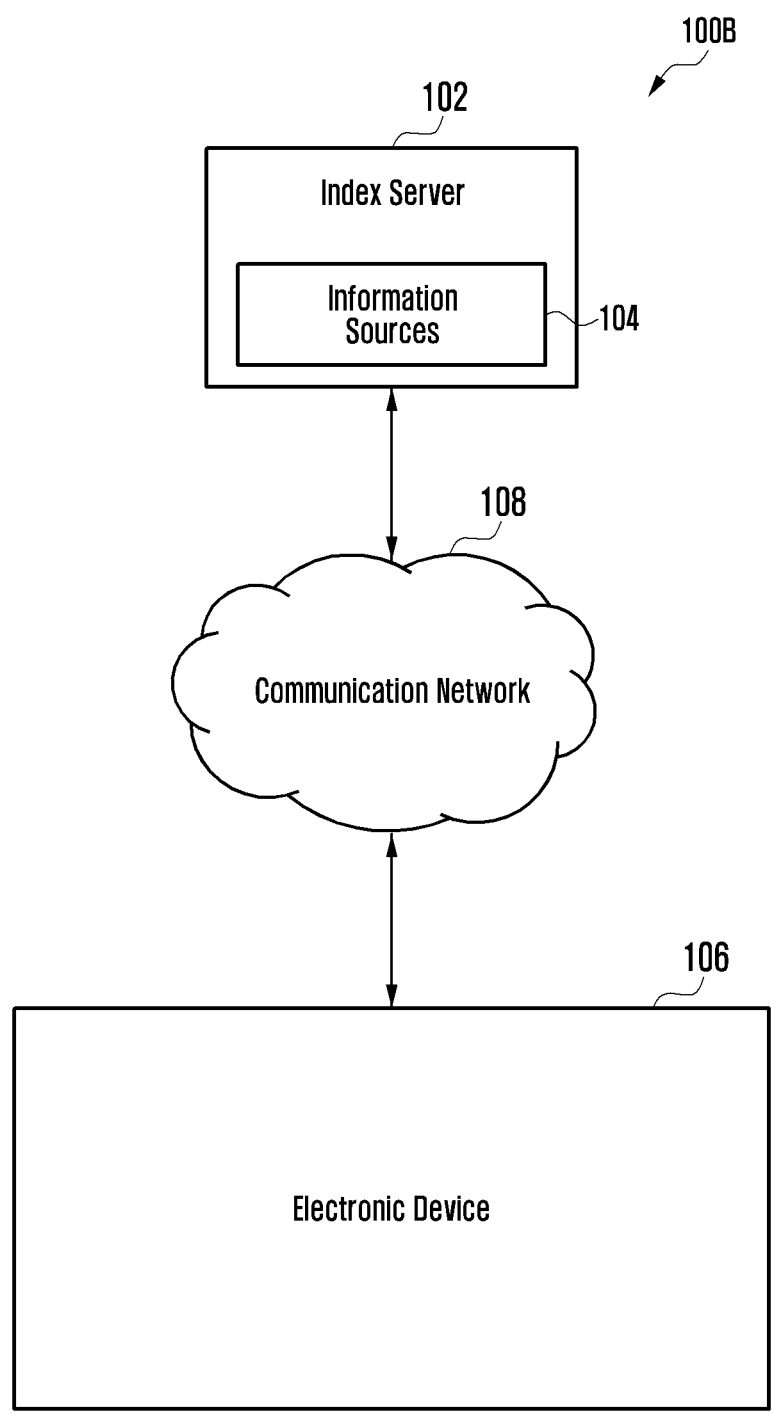
Figure 1C:
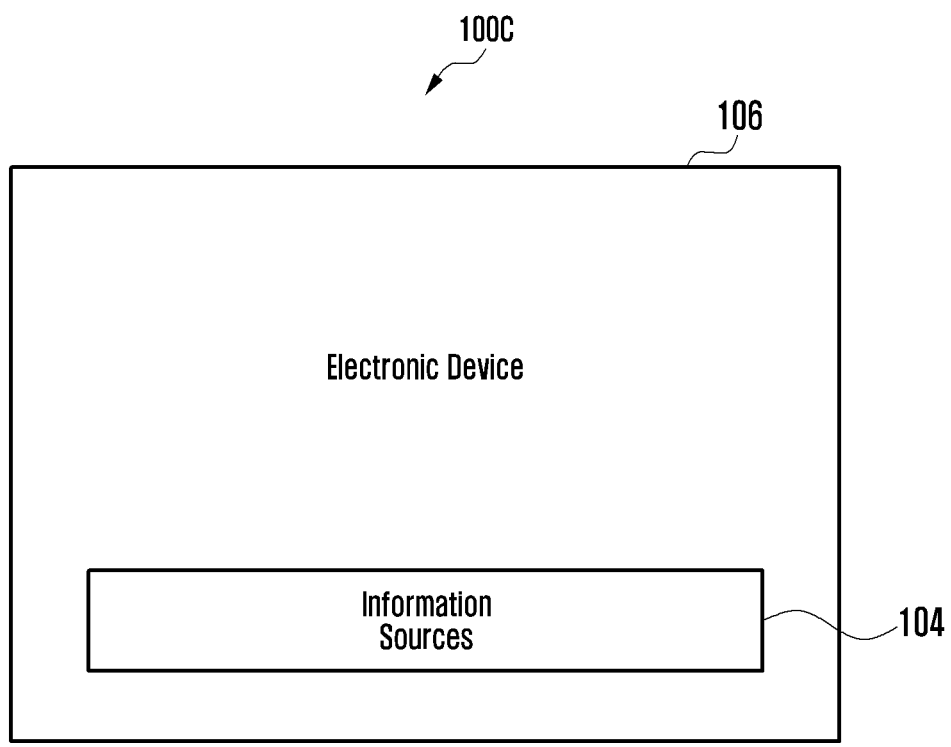

FIGS. 1A to 1C are schematic block diagrams of a system for providing semantically indexed content to an electronic device, according to exemplary embodiments. Referring to FIG. 1A, a system 100A includes an index server 102, a plurality of information sources 104, and an electronic device 106, which communicate with each other through a communication network 108.

Examples of the information sources 104 may include an electronic device of a content provider, knowledge graphs locally stored in an electronic device of a user, a user's knowledge graphs, a friend's electronic device, a friend's friend's electronic device, a group's electronic device, a division's electronic device, a server, a community's electronic device, a company's electronic device, an organization's electronic device, a customer management electronic device, an expert's electronic device, etc., but are not limited thereto.

The index server 102 is configured to extract first intent data related to respective content data received from the plurality of information sources 104. The first intent data is extracted by performing a semantic analysis for the content data received from the plurality of information sources 104. The index server 102 is configured to dynamically index the content received from the plurality of information sources 104, based on an extent of semantic similarity between a plurality of data items related to the content data received from the respective information sources 104.

The electronic device 106 allows the user to navigate and view various available content over the World Wide Web (WWW) by using a browser. The electronic device 106 may include, for example, mobile phones, personal digital assistants (PDAs), mobile personal computers, laptops, tablets, phablets, desktop computers, communicators, devices equivalent thereto, etc., but are not limited thereto.

Referring to FIG. 1B, a system 100B includes the information sources 104 that are part of the index server 102. For example, the index server 102 of a news content provider may include the plurality of information sources 104. Indexed content may be dynamically organized in the index server 102, based on content that is provided by deriving an extent of semantic similarity between a plurality of data items related to content received from the respective information sources 104. When the user of the electronic device 106 browses content in webpages provided by the news content provider, an availability of indexed content is shown on a browser to view the related content. The index server 102 may provide, based on a user gesture applied to the browsed content, the requested content in chronological order.

The index server 102 may semantically index documents (e.g., articles). The index server 102 may include a metadata extractor, a semantic linker, and an indexer.

The metadata extractor may extract metadata about one or more events or topics related to a document. The sematic linker may link documents according to one or more events or topics. The indexer may index the linked documents.

Referring to FIG. 1C, when the electronic device 106 is not connected to the communication network 108, a system 100C includes the information sources 104 that are part of the electronic device 106. The system 100C provides content to a user by using in-device content of the electronic device 106. The content provided to the user is based on the information sources 104 available to the electronic device 106. Examples of the information sources 104 of the electronic device 106 may include a device-memory, browser history data, a user's knowledge graphs, a friend's electronic device, a friend's friends' electronic device, a group's electronic device, a division's electronic device, a community's electronic device, a company's electronic device, an organization's electronic device, a customer management electronic device, an expert's electronic device, etc., but are not limited thereto. The electronic device 106 may be configured to analyze content provided by a browser, and extract intent data, such as context of data, content in the browser, metadata related to content in the browser, etc. Based on the extracted intent data, an in-device analyzer may be configured to provide semantically linked content available to the information sources 104 in the electronic device 106.

According to an exemplary embodiment, the electronic device 106 may perform a semantic analysis for an article browsed by a user to extract metadata for one of related events and topics. The electronic device 106 may dynamically index content based on the extracted metadata. The electronic device 106 may provide indexed content to the user, based on user gestures. The indexed content may be content related to a document that is browsed by a user.

According to an exemplary embodiment, an information source of indexed content may be one of the following: different information sources of the Internet, different content of the same information source, and content locally stored in the electronic device 106. The different information sources of the Internet may be an alternate source of a document matching extracted metadata. The different content from the same information source may be chronologically related to documents.

According to an exemplary embodiment, the electronic device 106 may include a user interface for browsing content. The user interface may include content displayed on the electronic device 106 and at least one of the indicia displayed along with the content. The electronic device 106 may receive user inputs to the indicia. When the electronic device 106 receives the user input to the indicia, it may provide content related the user input. The related content may be content that has been semantically related to the displayed content. The user input may include at least one of the following: a swipe gesture, a tap gesture, a long gesture, and a hold and drag gesture.

The communication network 108 may be configured to support a system by assisting the electronic device 106 to access a service interface related to the index server 102. Examples of the communication network 108 may include Personal Area Network (PAN), Local Area Network (LAN), Wide Area Network (WAN), Global System for Mobile Communication (GSM), Internet, value-added network (VAN), wireless communication network, full-duplex cable network, satellite network, interactive kiosk network, cellular network, Personal Mobile Gateway (PMG), short-range communication network such as Bluetooth, Near Field Communication (NFC), and different types of communication networks providing inter-device communication.

Although the systems 100A, 100B, and 100C are shown in FIGS. 1A, 1B and 1C, other exemplary embodiments are not limited to them. The systems may include a number of electronic devices and servers along with hardware and software components, may dynamically organize content, and may provide the organized content to users. For example, the components may be processes executed on a controller or processor, objects, executable processes, execution threads, programs, and computers, but are not limited thereto.

Figure 2:
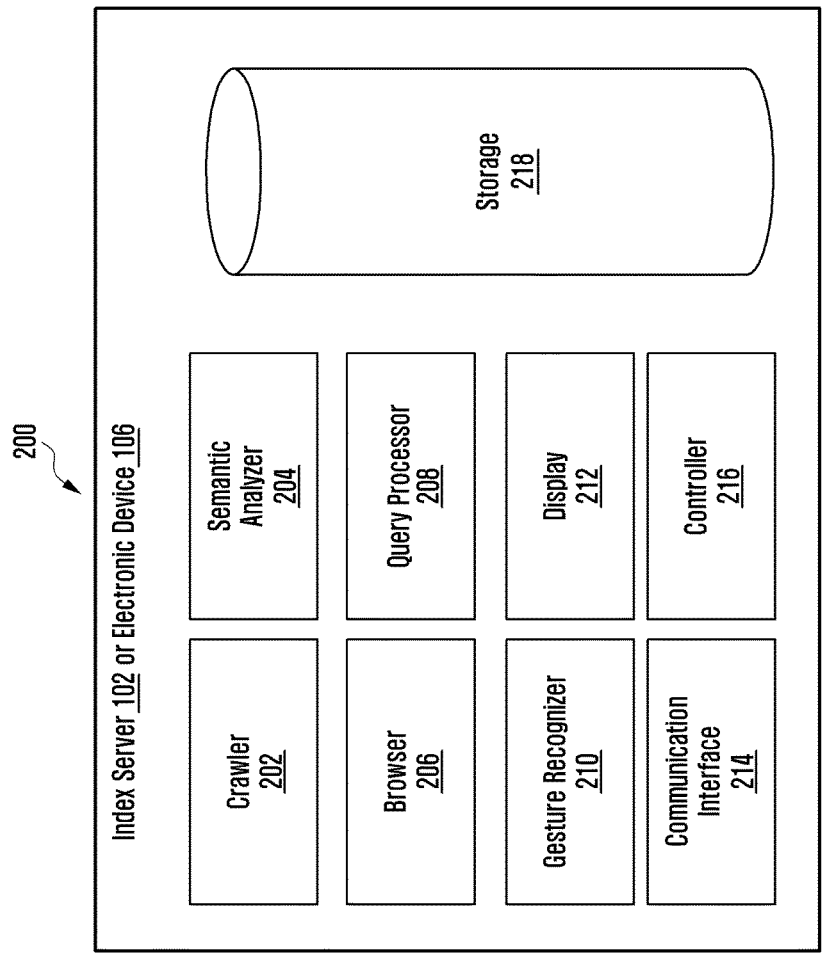
FIG. 2 is a schematic block diagram of an index server or an electronic device, according to an exemplary embodiment.

FIG. 2 is a schematic block diagram of the index server 102 or the electronic device 106, according to an exemplary embodiment. In an exemplary embodiment, the index server 102 or the electronic device 106 includes portions 200, which include a crawler 202, a semantic analyzer 204, a browser 206, a query processor 208, a gesture recognizer 210, a display 212, a communication interface 214, a controller 216, and a storage 218.

The crawler 202 of the index server 102 is configured to navigate content on the World Wide Web (WWW). In an exemplary embodiment, the crawler 202 may check text of resources for a plurality of webpages and may follow navigable references (e.g., hyperlinks) from different content resources. The crawler 202 may be configured to mark respective content sources and may find out a great number of content sources through the navigable references. The crawler 202 of the electronic device 106 may be configured to mine semantically related content in the electronic device 106. In an exemplary embodiment, the crawler 202 of the index server 102 may be configured to navigate related content from the plurality of information sources 104.

In an exemplary embodiment, the semantic analyzer 204 may be configured to dynamically index content, based on first intent data extracted. The first intent data is extracted from content received from the plurality of information sources 104, by using a sematic analyzer related to the semantic analyzer 204. The first intent data includes, for example, metadata of content, content, and context of data, but is not limited thereto. The semantic analyzer 204 may derive a plurality of data items from the content received from the plurality of information sources 104. The semantic analyzer 204 may be configured to derive the extent of semantic similarity between a plurality of data items related to content from the respective, derived, information sources 104. When the extent of semantic similarity exceeds a semantic threshold, the semantic analyzer 204 may index content from an information source 104.

In an exemplary embodiment, the semantic analyzer 204 may be configured to extract second intent data related to at least one object that is browsed by a user. A plurality of data items from at least one object that is browsed by a user are determined. The plurality of data items determined may include a topic, event, subject, content, word vector, token, and context information, which are related to objects, but is not limited thereto. The second intent data is extracted by the semantic analyzer 204, through a semantic analysis for the determined data items browsed by a user.

The browser 206 may be configured to search for, provide and traverse information resources on the World Wide Web (WWW). Examples of the web browsers are Firefox, Internet Explorer, Google Chrome, Opera, Safari, etc. but are not limited thereto. In an exemplary embodiment, the browser 206 may be used to access information from file systems of the electronic device 106. In an exemplary embodiment, the browser 206 may be configured to display indicia, along with content. The indicia indicate that indexed content is available to the browsed web page. The indicia are displayed in the form of marks indicating the availability of indexed content. Different indicia indicate previous content, following content, content from the same information sources, and content from the plurality of information sources 104. Content may be related to an event, multimedia stream, document (e.g., article), content, topic, etc.

The query processor 208 may be configured to analyze at least one object that is browsed by a user and extract second intent data related to the object. The extracted intent data is transmitted to the semantic analyzer 204 so that it is further processed. In an exemplary embodiment, the query processor 208 may be configured to extract first intent data from content received from the plurality of information sources 104 by using a semantic analyzer related to the semantic analyzer 204.

The gesture recognizer 210 may be configured to identify gestures that a user makes to browsed content that is rendering on the display of the electronic device 106. The browser 206 may identify, when a user gesture is made on a browsed object, the requested content corresponding to the user gesture. In an exemplary embodiment, as users make gestures on indicia indicating the availability of indexed content, a great amount of content can be received. The browser 206 may communicate with the query processor 208 to search for and display indexed content according to the identified user gestures.

The display 212 may be configured to render content on the display screen of the electronic device 106. The display 212 may be configured to display the indexed content on the screen of the electronic device 106, based on the results from the semantic analyzer 204.

The communication interface 214 may be configured to make communication between the electronic device 106 and the index server 102, based on the service interface configured by the index server 102. In an exemplary embodiment, the service interface may be enabled or disabled according to a user request.

In an exemplary embodiment, the controller 216 may be configured to control and adjust functions of the portions in the electronic device 106 and to provide content indexed in chronological order. The controller 216 may be configured to control and adjust functions of the portions in the index server 102 and to dynamically organize content in the index server 102.

Although the portions 200 of the index server 102 or the electronic device 106 are shown in FIG. 2, other exemplary embodiments are not limited to them. The labels or names of the portions 200 are merely used for the purpose of distinguishing components from others and not intended to limit the scope of the present exemplary embodiment. IA function (functions) of one or more portions may be executed in a combination of the same or different portions or separately, without departing the scope of the exemplary embodiments. The electronic device 106 and the index server 102 may also include other portions for making local or remote communication to dynamically organize content for users, along with other hardware or software components. For example, the components may be processes executed on a controller or processor, objects, executable processes, execution threads, programs, and computers, but are not limited thereto. In addition, the electronic device 106 and applications executed on the electronic device 106 may be components.

Figure 3:
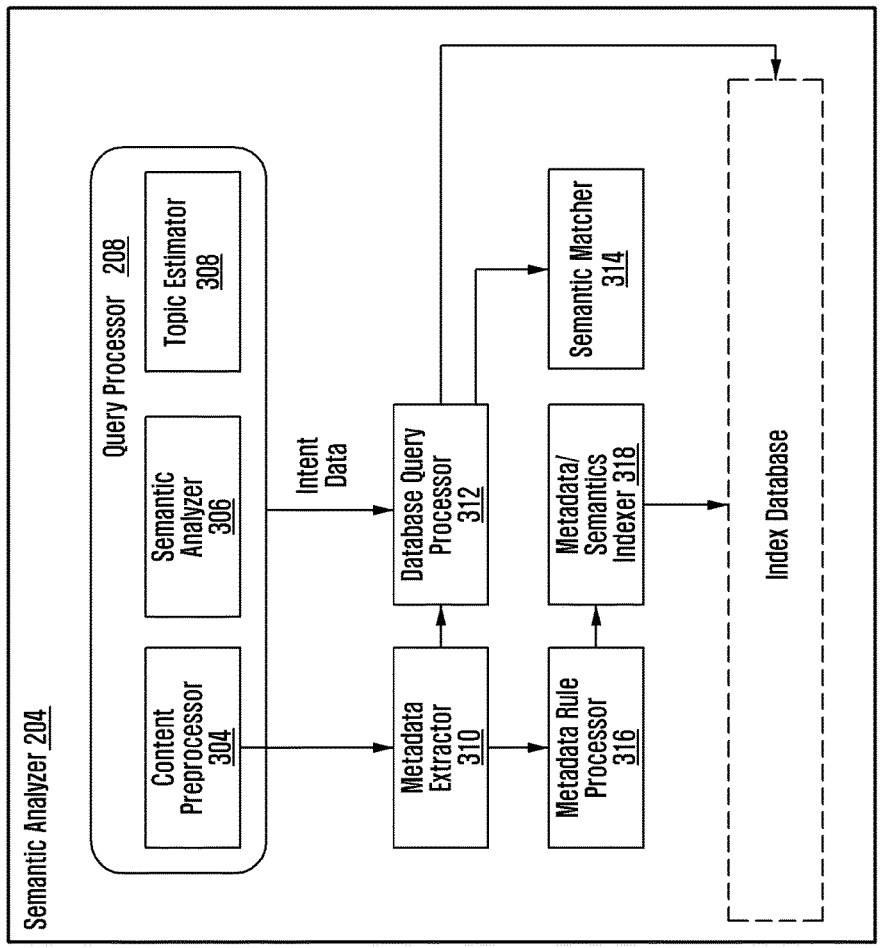
FIG. 3 is a schematic block diagram of a semantic analyzer configured to dynamically organize content, according to an exemplary embodiment.

FIG. 3 is a schematic block diagram illustrating the semantic analyzer 204 configured to dynamically organize content, according to an exemplary embodiment. Referring to FIG. 3, the semantic analyzer 204 includes the query processor 208, a metadata extractor 310, a database query processor 312, a semantic matcher 314, a metadata rule processor 316, and a metadata/semantics indexer 318.

The query processor 208 includes a content pre-processor 304, a semantic analyzer 306, and a topic estimator 308. The query processor 208 is configured to extract first intent data from content received from the plurality of information sources 104 by using the semantic analyzer 306, to establish an index database in the index server 102. The content pre-processor 304 is configured to extract a plurality of data items related to the content received from the respective information sources 104. Based on a use status of words, a distribution of each word is first considered, irrespective of a correlation with other words. During the processing of the content, the metadata extractor 310 is configured to extract metadata related to the content.

The query processor 208 may be configured to extract intent data related to content that is browsed by a user of the electronic device 106.

The semantic analyzer 306 is configured to provide a minimum number of data items, thereby providing compact representations for data item-content relations. The data items include topic information related to the content received from the respective information sources 104. A plurality of data items in the content from the respective information sources 104 is analyzed by the semantic analyzer 306, thereby creating a topic distribution pattern. The topic estimator 308 is configured to extract various topics in objects that are browsed by a user. The extracted topics and the data-word relations form the first intent data related to the content received from the plurality of information sources 104.

The query processor 208 may be configured to analyze at least one object that is browsed by a user, and extract second intent data related to the object.

The extracted intent data is transmitted to the database query processor 312. The database query processor 312 is configured to extract queries, based on the first intent data containing the metadata received from the metadata extractor 310.

The extracted intent data containing the determined data items is transmitted to the semantic matcher 314. The semantic matcher 314 is configured to determine an extent of semantic similarity between the plurality of data items derived from the plurality of information sources 104. When the extent of semantic similarity exceeds a semantic threshold, the content from the respective information sources 104 is selected to be indexed.

The metadata created by the metadata extractor 310 is processed by the metadata rule processor 316. The metadata rule processor 316 arranges semantically linked content in chronological order by using the metadata created by the metadata extractor 310. For example, timestamps may be used to arrange the content in chronological order. The metadata rule processor 316 may be configured to process metadata, based on metadata rules such as content linking, content quality, metadata threshold, etc.

The metadata/semantics indexer 318 indexes semantically related content from the respective information sources 104 in the index database, based on content, selected from respective information to be indexed, and the metadata processed by the metadata rule processor 316.

Figure 4A:
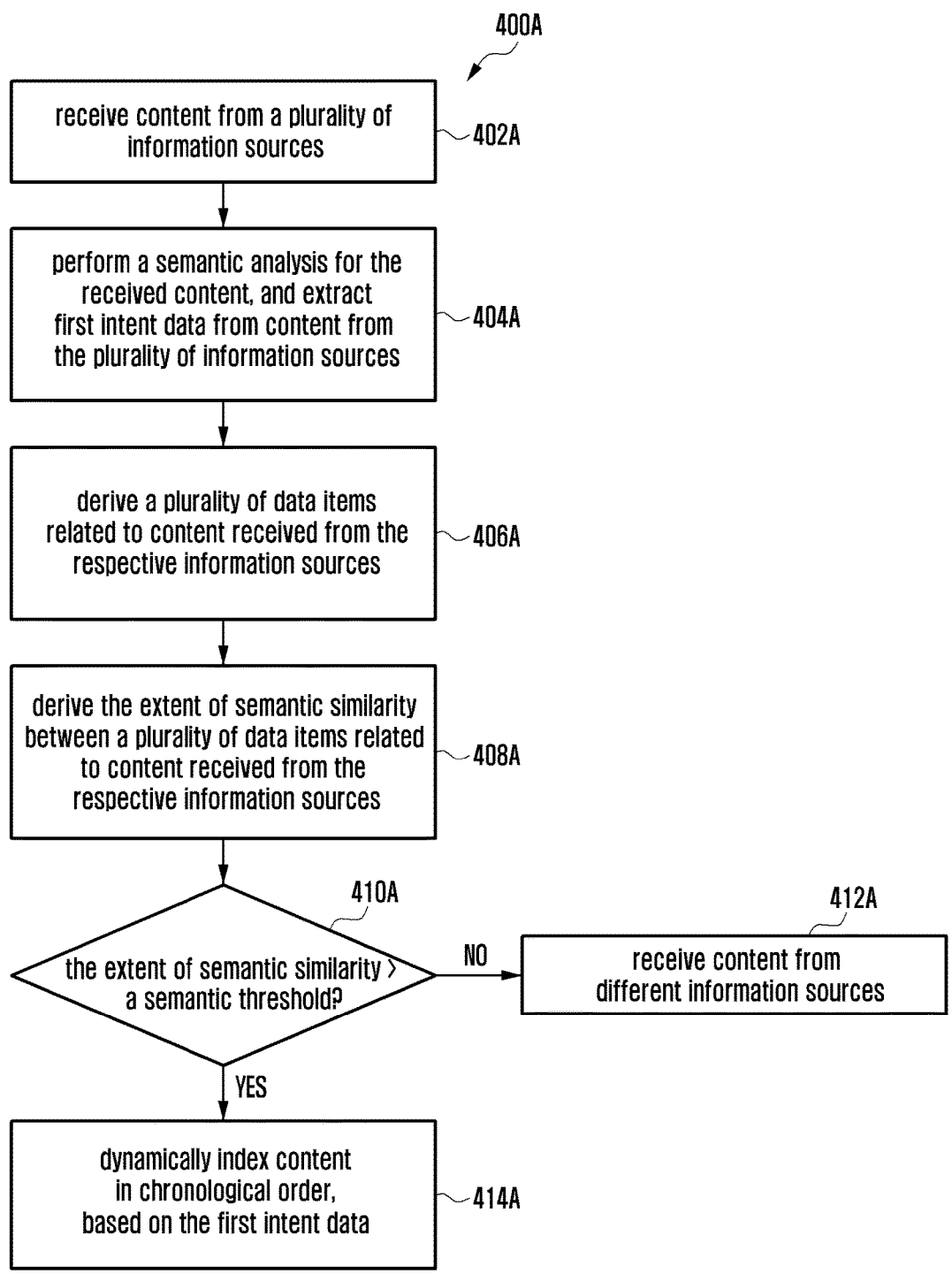
FIG. 4A is a flowchart of a method of dynamically indexing content from a plurality of information sources, according to an exemplary embodiment.

FIG. 4A is a flowchart of a method 400A of dynamically indexing content from the plurality of information sources 104, according to an exemplary embodiment. The steps of the method 400A are descried in respective blocks. The method 400A and the description provide basis for control programs that can be implemented by using a micro-controller, micro-processor, or computer-readable storage media.

In step 402A, the method 400A includes a process of receiving content from the plurality of information sources 104. In an exemplary embodiment, content may be received from the plurality of information sources 104 based on user concerns. In an exemplary embodiment, content may be received from the user designated information sources 104. In an exemplary embodiment, the index server 102 may receive similar content, based on the popularity of content, from the plurality of information sources 104, by using the crawler 202. In the method 400A, the index server 102 may receive the information sources 104 from the plurality of information sources 104.

In step 404A, the method 400A includes a process of performing a semantic analysis for the received content, and extracting first intent data from the content from the plurality of information sources 104. In the method 400A, the query processor 208 of the semantic analyzer 204 may extract first intent data related to content received from the plurality of information sources 104. The first intent data include metadata received from the plurality of information sources 104, content and context data of content.

In step 406A, the method 400A includes a process of deriving a plurality of data items related to the content received from the respective information sources 104. In the method 400A, the semantic analyzer 306 extracts first intent data and derives a plurality of data items related to content received from the respective information sources 104.

In step 408A, the method 400A includes a process of deriving the extent of semantic similarity between the plurality of data items related to the content received from the respective information sources 104. In the method 400A, the semantic analyzer 306 analyzes the derived data items and determines the extent of semantic similarity between content received from the plurality of information sources 104.

In step 410A, the method 400A includes a process of determining whether the extent of semantic similarity exceeds a semantic threshold. In the method 400A, the semantic analyzer 204 determines whether the extent of semantic similarity exceeds a semantic threshold. When the extent of semantic similarity exceeds a semantic threshold, the semantic analyzer 204 may determine that content from the respective information sources 104 has been dynamically linked, based on the extracted, first intent data.

In step 412A, in response to the determination that the extent of semantic similarity does not exceed the semantic threshold, the method 400A includes a process of receiving content from different information sources in step 412A.

In step 414A, in response to the determination that the extent of semantic similarity exceeds the semantic threshold, the method 400A includes a process of dynamically indexing content in chronological order, based on the extracted first intent data.

The following description is an example where information about news events is received from webpages of news service providers. The crawler 202 may be configured to crawl on and fetch webpages from content providers and to provide the webpages to the index server 102. The index server 102 receives information as follows.

Date: Aug. 20, 2014
News 1 (A1): New Chief Minister of Gujarat
News 2 (A2): Execution of Gang rapists by hanging
News 3 (A3): New Super Bike, Ducati, at Autoexpo
Date: Aug. 19, 2014
News 1 (B1): Narendra Modi, Resignation from Chief Minister of Gujarat
News 2 (B2): Flash Flood in Meghalaya
News 3 (B3): Quarterly Profit of 28% jump, Biocon
Date: Aug. 16, 2014
News 1 (C1): BJP, Win Landslide Victory in elections
News 2 (C2): Announcing a sentence to gang rape, on 20
News 3 (C3): Fall in the price of rubber The index server 102 organizes the received content, based on the creation in time (or chronological order), an performs a semantic search for content that has been previously indexed, at time t−1. When the linked semantic content is not available at time t−1, the index server 102 may check indexes at time t−2. When the linked content is available at time t−1, the index server 102 stops the indexing at time t−1 (which will be obvious from the example).

When topics about elections are selected, content is: C1 at time t−2; C1 at time t−2; and B1 at time t−1.

When considering a topic of article A1 and first intent data related to the topic, the semantic analyzer 204 may first search for content at time t−1. Searching for Article A1 may be performed based on B1, B2, and B3. When A1 is semantically linked with B1 and the extent of semantic similarity exceeds a semantic threshold, the semantic analyzer 204 may determine that B1 and A1 have the maximum semantic link to break the link. B1 may already have been linked to C1. In that case, the indexed content may be A1-B1-C1.

Similarly, when considering a topic of article A2 and first intent data related to the topic, the semantic analyzer 204 may analyze content at time t−1 and determine that any semantically linked content is not available. After that, the semantic analyzer 204 may search for content at time t−2 and perform a sematic matching for C1, C2 and C3. Referring to the list of received information, it will be appreciated that C2 has been semantically related to an article. After that, A2 will be linked to C2.

When the semantic analyzer 204 analyzes content in article A3, it may determine that any semantically linked content is not available at t−1 and t−2. Therefore, any index does not exist for the article.

Actions, operations, blocks, steps, etc. in the method 400A may be performed in the sequence proposed above or in a sequence that differs from the proposed sequence or they may be perform simultaneously. Some of the exemplary embodiments may be modified to apply removal, addition, alteration or skipping to the actions, operations, blocks, steps, etc. in the method, without departing the scope of the exemplary embodiments.

FIG. 4B is a flowchart of a method 400B of providing indexed content on the electronic device 106, according to an exemplary embodiment. The steps of the method 400B are descried in respective blocks. The method 400B and the description provide basis for control programs that can be implemented by using a micro-controller, micro-processor, or computer-readable storage media.

In step 402B, the method 400B includes a process for a user of the electronic device 106 to view content by a browser in step 402B. In the method 400B, the browser 206 renders content on the user interface of the electronic device 106.

In step 404B, the method 400B includes a process of determining a plurality of data items available from at least one object in the browsed content. Examples of the data items include a topic, event, subject, content, word vector, token, and context information, which are related to objects, but are not limited thereto. In the method 400B, the query processor 208 of the electronic device 106 may determine a plurality of data items from at least one object that is browsed by a user. Content of word vectors may be distributed according to the probability distribution. For example, one of the word vectors on a knowledge graph may be analyzed as a therapy for disease treatment using magnetic materials. Another word vector on a knowledge graph may be analyzed as a radiation-based disease therapy. Word vector links a topic and sub-topic to keywords in received content to provide user intended contextual information.

In step 406B, the method 400B includes a process of performing a semantic analysis for the plurality of determined data items. In the method 400B, the semantic analyzer 306 analyzes determined data items and extracts intent data related to data items in objects that are browsed by a user.

In step 408B, the method 400B includes a process of extracting second intent data related to at least one object, based on the semantic analysis. The second intent data may include metadata about objects browsed by a user, content, and context data about objects browsed by a user. In the method 400B, the semantic analyzer 306 may extract second intent data.

In step 410B, the method 400B includes a process of identifying at least one gesture made by a user. In the method 400B, a user may make gestures based on indicia displayed on webpages. The indicia provide represents to the user, indicating that index content about a topic that the user is viewing on the webpages is available.

In step 412B, the method 400B includes a process of providing indexed content on the electronic device 106 in chronological order. In the method 400B, content may be provided to the electronic device 106, based on the extracted, second intent data and a user made gesture. Content indexed by the index server 102 is provided to the electronic device 106, according to the identified user gesture.

Actions, operations, blocks, steps, etc. in the method 400B may be performed in the sequence proposed above or in a sequence that differs from the proposed sequence or they may be perform simultaneously. Some of the exemplary embodiments may be modified to apply removal, addition, alteration or skipping to the actions, operations, blocks, steps, etc. in the method, without departing the scope of the exemplary embodiments.

FIG. 5 is a table of a sparse semantic matrix showing information from the plurality of information sources 104, according to an exemplary embodiment. In an exemplary embodiment, FIG. 5 shows that semantically linked content from a plurality of sources is arranged, in chronological order, in a sparse semantic matrix. New online articles related to the election of 2014 in India are extracted from the information sources 104, such as Express India, Times of India, BBC.com, and Nyt.com. When a user loads webpages containing events and articles related to the election of 2014 in India, data items reflecting intent data for objects in the loaded webpages may be extracted.

Content that the index server 102 dynamically indexed, based on a semantic analysis for data items, may be transmitted to a browser of the electronic device 106. Representations of a variety of content availability indicia may be shown on the user' webpages. Content may be provided to a user, according to the user gestures applied to representations related to content availability indicia. Examples of the indicia on webpages are shown in FIGS. 8, 9, 10 and 11.

In an exemplary embodiment, a user may select a list of the information sources 104 for content. For example, for content related to news events, a user may request the index server to provide the user with content from the information sources 104, such as timesofindia.com, Express India, bbc.com, etc. In addition, the user may create the level of precedence to the respective information sources 104.

Figure 6:
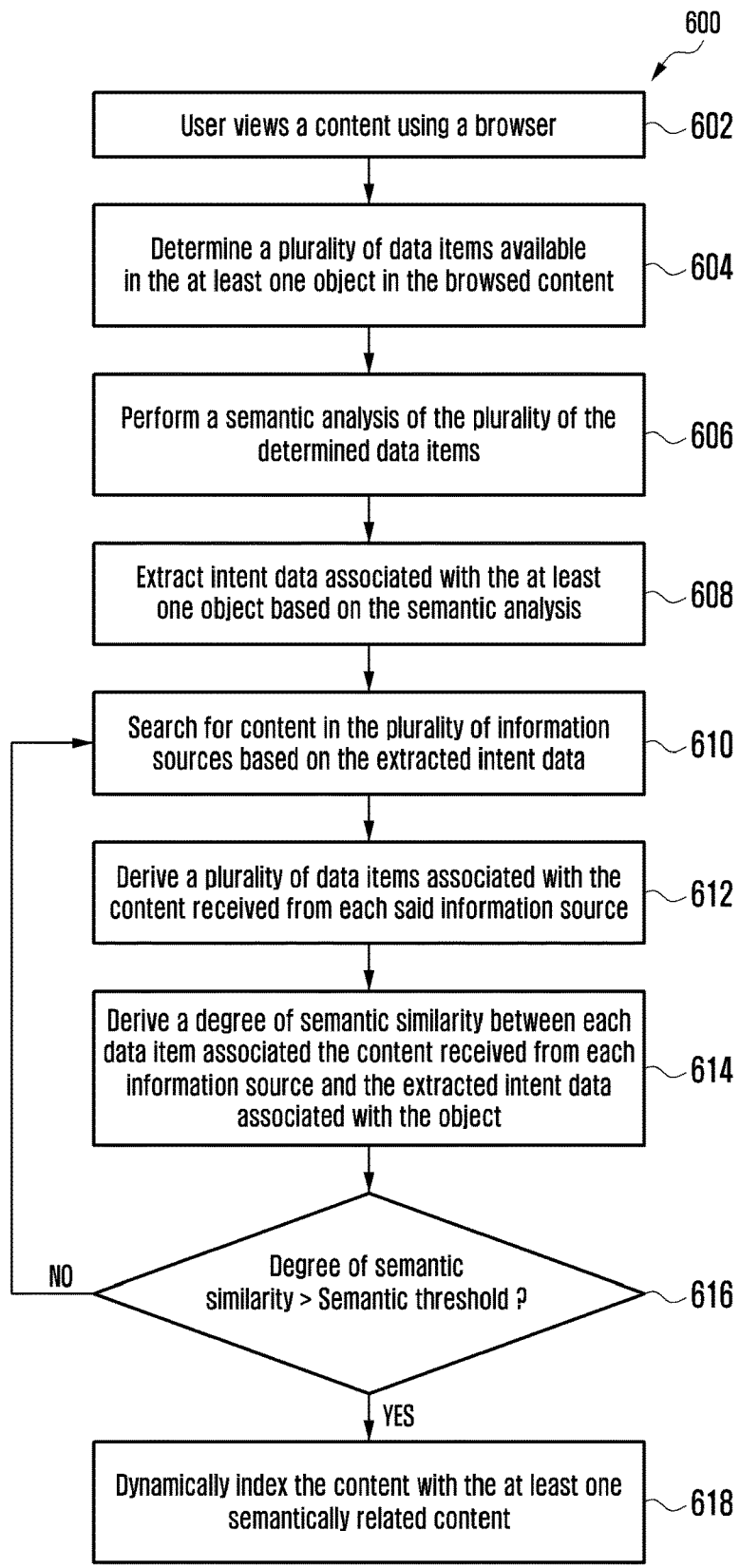
FIG. 6 is a flowchart of a method of providing indexed content on an electronic device by using in-device information sources, according to an exemplary embodiment.

FIG. 6 is a flowchart of a method 600 of providing indexed content on the electronic device 106 by using the in-device information sources 104, according to an exemplary embodiment.

In step 602, the method 600 includes a process for a user of the electronic device 106 to view content by a browser. In the method 600, the browser 206 may render content on the user interface of the electronic device 106, in offline mode.

In step 604, the method 600 includes a process of determining a plurality of available data items from at least one object in the browsed content. Examples of the data items may include a topic, event, subject, content, word vector, token, and context information, which are related to the object, but are not limited thereto. In the method 600, the query processor 208 of the electronic device 106 may determine a plurality of data items in at least one object that is browsed by a user.

In step 606, the method 600 includes a process of performing a semantic analysis for the plurality of determined data items. In the method 600, the semantic analyzer 204 analyzes the determined data items and extracts intent data related to data items in objects that are browsed by a user.

In step 608, the method 600 includes a process of extracting intent data related to at least one object, based on the semantic analysis. The intent data may include metadata about objects browsed by a user, content, and context data about objects browsed by a user.

In step 610, the method 600 includes a process of searching for content of the plurality of information sources 104 based on the extracted intent data.

In step 612, the method 600 includes a process of deriving a plurality of data items related to content received from the respective information sources 104 in the electronic device 106. In the method 600, the semantic analyzer 204 may derive a plurality of data items from content received from the respective information sources 104 in the electronic device 106.

In step 614, the method 600 includes a process of deriving the extent of semantic similarity between each of the data items related to the content received from the respective information sources 104 and the extracted intent data related to the at least one object. In the method 600, the semantic analyzer 204 may derive the extent of semantic similarity between data items extracted from the information sources 104 and intent data extracted from a browser.

In step 616, the method 600 includes a process of determining whether the extent of semantic similarity exceeds a semantic threshold. In the method 600, the semantic analyzer 204 may determine whether the extent of derived, semantic similarity exceeds a semantic threshold. When the extent of semantic similarity exceeds a semantic threshold, the semantic analyzer 204 may determine that content from the respective information sources 104 has been semantically linked, based on the extracted, first intent data.

In step 618, in response to the determination that the extent of semantic similarity exceeds a semantic threshold, the method 600 includes a process of dynamically indexing content to at least one dynamically related content item, based on the extracted intent data. The indexed content is provided to the user interface of the electronic device 106 according to user gestures applied to the electronic device 106.

As an example, it is considered that a user is listening to recorded multimedia. In that case, content related to the multimedia may be provided to the user according to the user gestures applied to content availability indicia.

In an exemplary embodiment, content availability indicia may be used to provide semantically related communications. For example, while a user is browsing emails, the semantically related emails in the electronic device may be provided according to the user gestures applied to icons of available content.

The steps of the method 600 are descried in respective blocks. The method 600 and the description provide basis for control programs that can be implemented by using a micro-controller, micro-processor, or computer-readable storage media.

Figure 7:
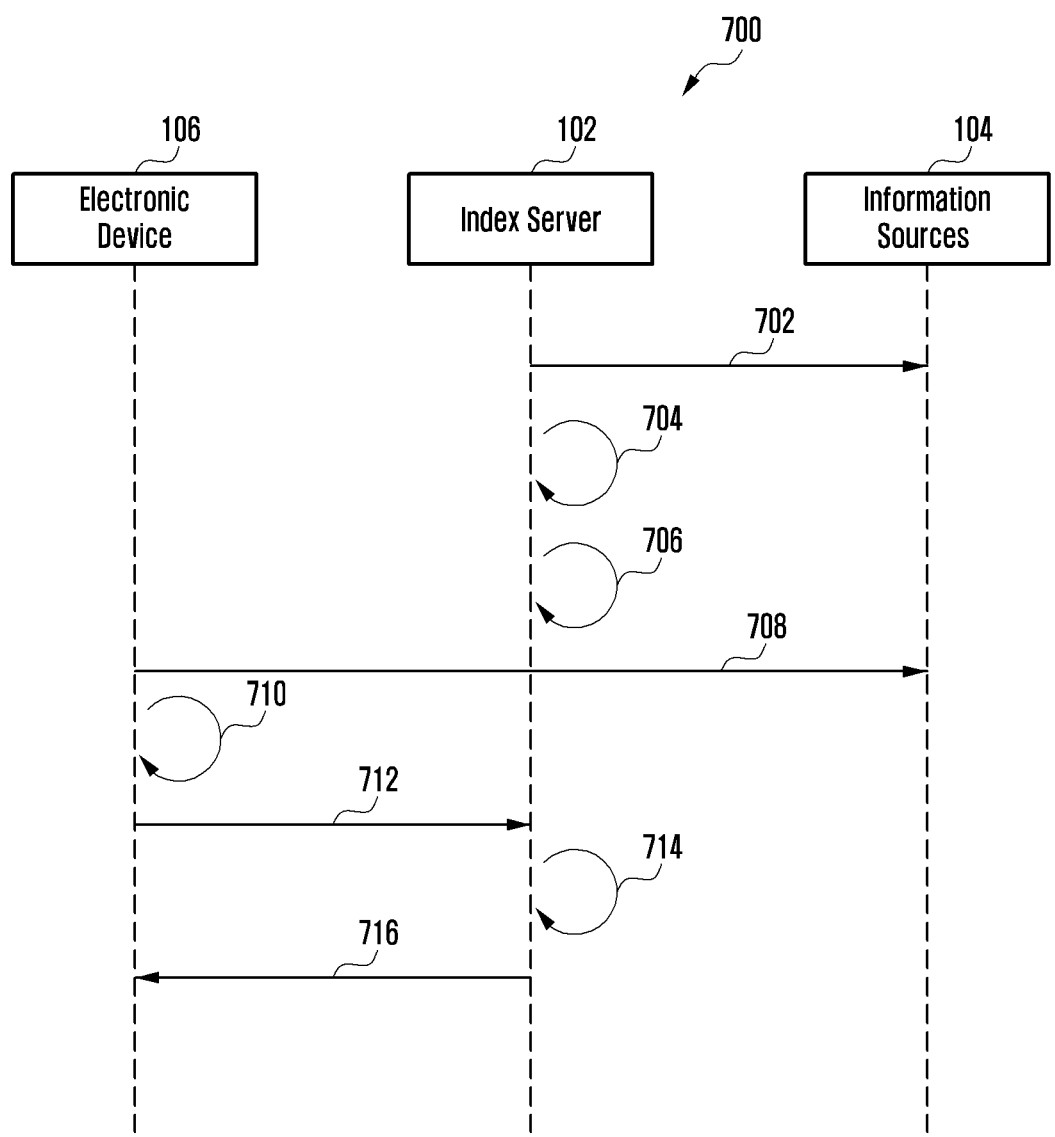
FIG. 7 is a swimlane diagram of a method of providing indexed content to an electronic device, according to an exemplary embodiment.

FIG. 7 is a swimlane diagram 700 of a method of providing indexed content to the electronic device 106, according to an exemplary embodiment.

In an exemplary embodiment, the index server 102 crawls content from the plurality of information sources 104 in step 702. The semantic analyzer 306 of the index server 102 extracts first intent data related to the content received from the plurality of information sources 104 in step 704. The semantic analyzer 204 is configured to index content, based on the extracted first intent data, in step 706.

The electronic device 106 fetches webpages from one of the information sources 104 in step 708. The electronic device 106 performs a semantic analysis for objects in the fetched webpages that are browsed by a user, and extracts second intent data in step 710. The extracted, second intent data is transmitted to the index server 102 in step 712.

The index server 102 is configured to establish a list of related index content in chronological order in step 714. The indexed content is created for a webpage and transmitted to the electronic device 106 to receive user interactions in step 716.

Figure 8:
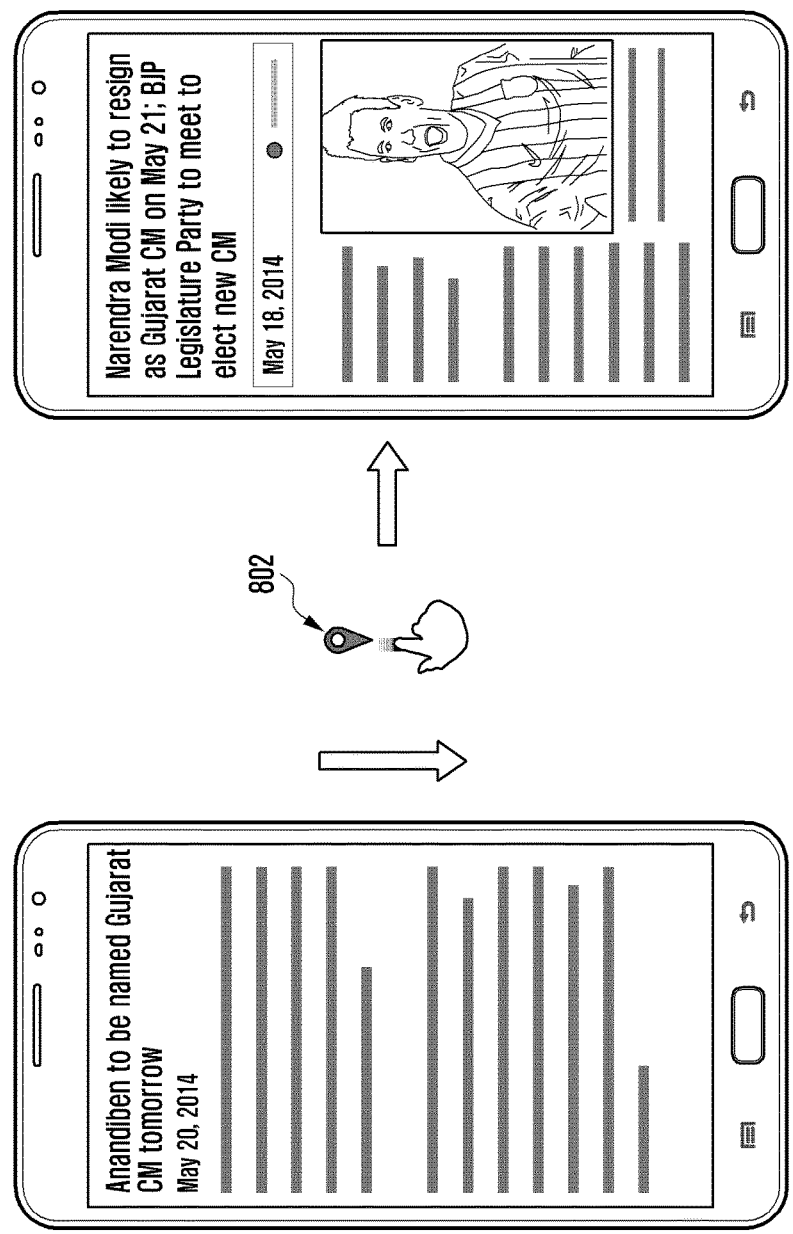
FIG. 8 is a diagram illustrating user interfaces of an electronic device to which previous news articles semantically linked to current news articles are provided, based on a user's interactions, according to an exemplary embodiment.

FIG. 8 is a diagram illustrating user interfaces of the electronic device 106 to which previous news articles semantically linked to current news articles are provided, based on user interactions, according to an exemplary embodiment. As shown in FIG. 8, news articles related to new chief minister of Gujarat are provided to user interfaces by using the browser 206 of the electronic device 106. As indicated by the reference number 802, the user makes a pull-down gesture on an icon of available content. Based on an identified gesture, the index server 102 provides previous news articles from the different information sources 104, e.g., a news article of resignation from current chief minister of Gujarat.

In an exemplary embodiment, when a user makes a slide gesture on an icon of available content while browsing documents (e.g., articles), the index server 102 may provide semantically linked documents from the different information sources 104 to the electronic device 106.

Figure 9:
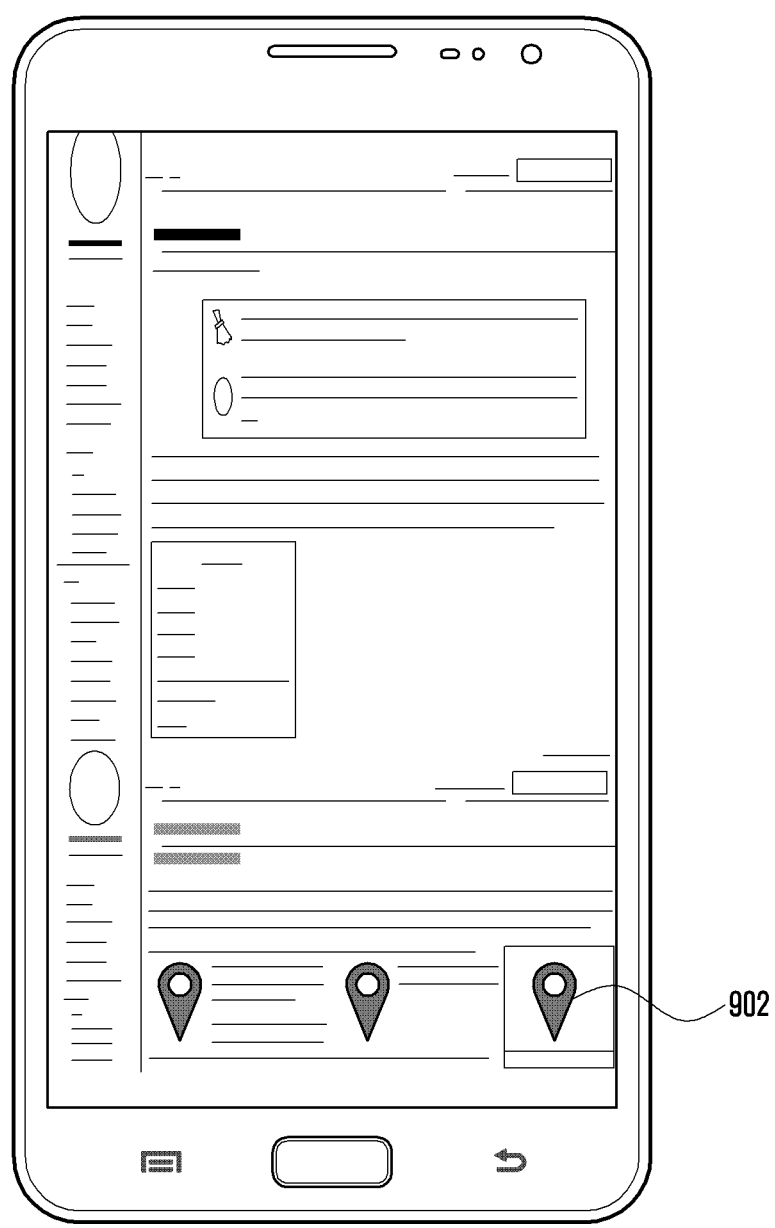
FIG. 9 is a diagram illustrating a user interface showing index content availability indicia in a document (e.g., a knowledge article) rendered by a browser of an electronic device, according to an exemplary embodiment.

FIG. 9 is a diagram illustrating a user interface showing index content availability indicia in a document (e.g., a knowledge article) rendered by the browser 206 of the electronic device 106, according to an exemplary embodiment. In an exemplary embodiment, when content indexing knowledge document webpages are available from the index server 102, a plurality of index content availability indicia 902 at different locations of the webpages may be displayed on the user interface. These indicia provide representations to users, indicating that indexed content is available as documents related to browsed knowledge documents. The indexed content may be provided to the electronic device 106 according to the user gestures.

Figure 10:
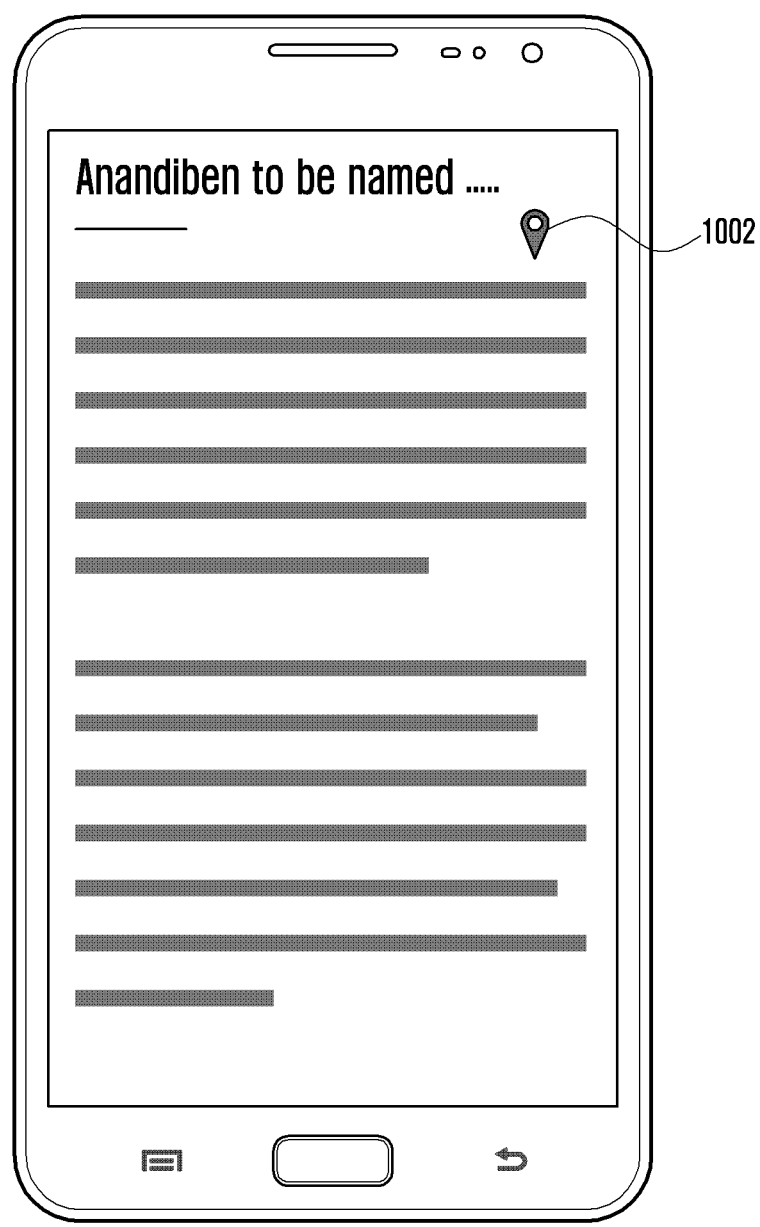
FIG. 10 is a diagram illustrating a user interface showing a plurality of indexed content availability indicia of a knowledge document when a user browses documents in an offline state, according to an exemplary embodiment.

FIG. 10 is a diagram illustrating a user interface showing a plurality of indexed content availability indicia on a knowledge document (e.g., article) when a user browses documents in an offline state, according to an exemplary embodiment. As shown in FIG. 10, a representation informing a user that semantically linked content is available is a type of indicia 1002.

Figure 11A:
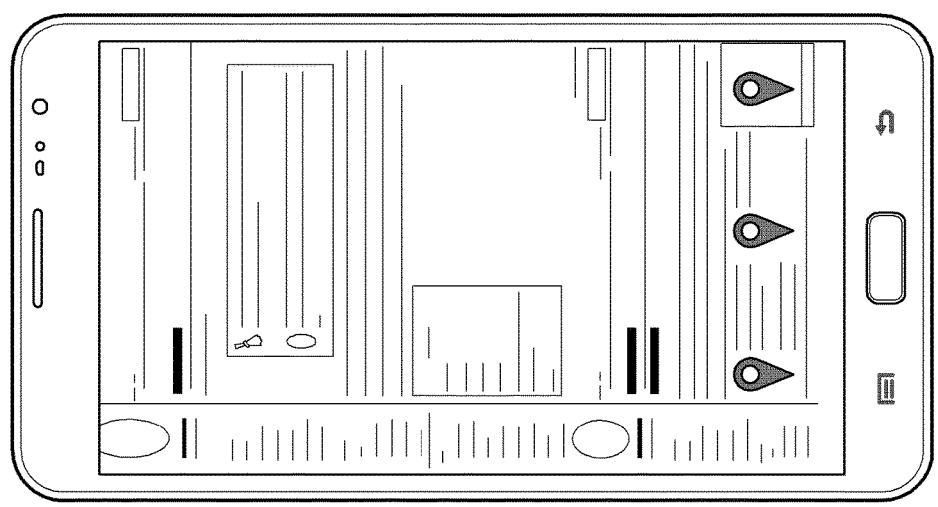
FIGS. 11A and 11B are diagrams illustrating user interfaces showing a plurality of content availability indicia in a knowledge document viewed on a webpage and representations on a tutorial configured for a knowledge document (e.g., a knowledge article) in a browser, according to an exemplary embodiment.
Figure 11B:
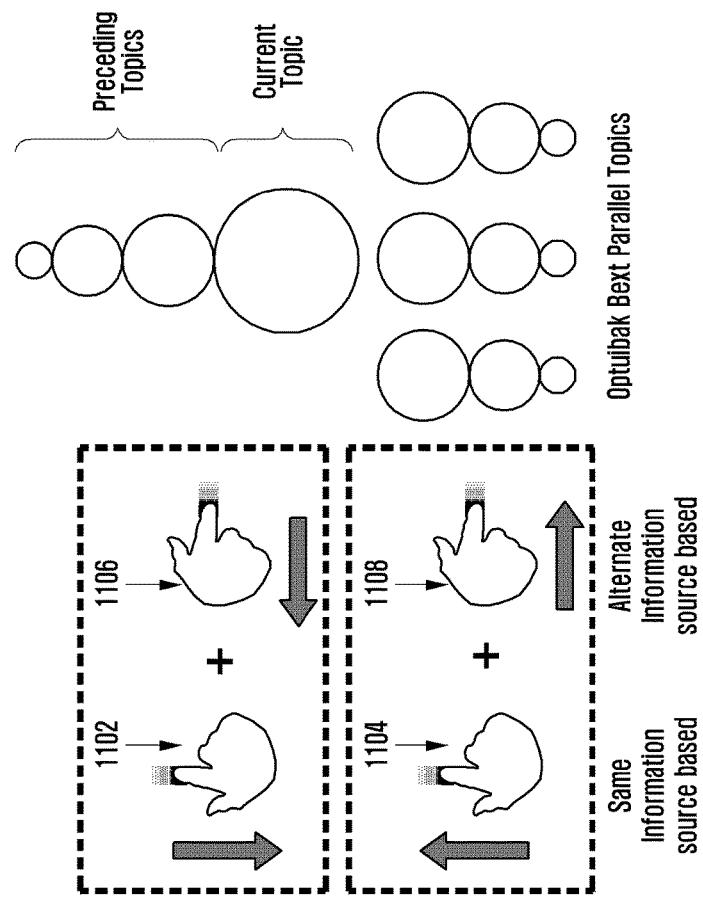

FIGS. 11A and 11B are diagrams illustrating user interfaces showing a plurality of content availability indicia in a knowledge document (e.g., article) viewed on a webpage and representations on a tutorial configured for a knowledge document in a browser, according to an exemplary embodiment. FIGS. 11A and 11B illustrate a user interface of the electronic device 106 on the divided windows of which two semantically linked documents from the same information sources 104 are displayed.

In an exemplary embodiment, the index server 102 may be configured to identify a gesture (a vertical swipe or a top-down swipe) 1102 and to provide documents that are before the current document and from the same information source 104. In an exemplary embodiment, the index server 102 may be configured to identify a gesture (a vertical swipe or a bottom-up swipe) 1104 and to provide documents that are after the current document and from the same information source 104. In an exemplary embodiment, the index server 102 may be configured to identify a gesture (a horizontal swipe or a right to left swipe) 1106 and to provide documents that are before the current document and from the different information sources 104. In an exemplary embodiment, the index server 102 may be configured to identify a gesture (a horizontal swipe or a left to right swipe) 1108 and to provide documents that are after the current document and from the different information sources 104. In an exemplary embodiment, the index server 102 may also be configured to identify a combination of gestures 1102 and 1106 and to derive topics that are before the current document in the browser. In an exemplary embodiment, the index server 102 may also be configured to identify a combination of gestures 1104 and 1108 and to derive topics that are after the current document in the browser. The above gestures may be made on or around a display of the electronic device 106.

Although the exemplary embodiments are explained through swipe-based gestures, the exemplary embodiments are not limited by the gestures. In addition, the indicia may be formed in different colors to indicate the availability of content. The indicia may also be formed so that the color indicates type of available indexed content.

Figure 12:
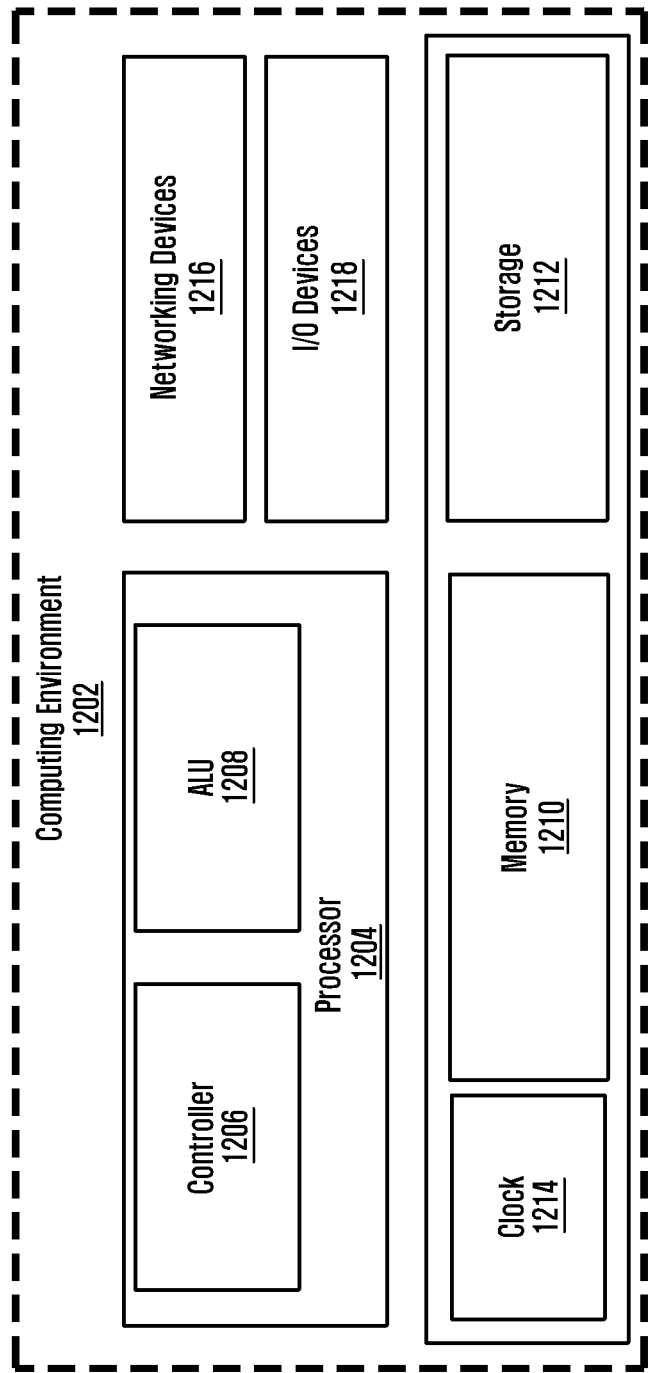
FIG. 12 is a block diagram of a computing environment where a system and a method is implemented that dynamically organizes content in a server and provides indexed content to an electronic device, according to an exemplary embodiment.

FIG. 12 is a block diagram of a computing environment 1202 where a system and a method are implemented that dynamically organizes content in a server and provides indexed content to the electronic device 106, according to an exemplary embodiment. As shown in FIG. 12, the computing environment 1202 includes: at least one processor 1204 with a controller 1206 and an arithmetic logic unit (ALU) 1208; memory 1210; storage 1212; clock chip 1214; a plurality of network devices 1216; and a plurality of input/output (I/O) devices 1218.

The processor 1204 processes instructions of an algorithm. The processor 1204 receives commands from the controller 1206 and processes the commands. The processor 1204 also computes logic and arithmetic operations related to the execution of instructions, through the ALU 1208. The entire computing environment 1202 may include homogenous or heterogeneous multi-cores, a plurality of different types of CPUs, dedicated media accelerator and other types of accelerators. The processor 1204 processes instructions of an algorithm. The processor 1204 receives commands from the controller 1206 and processes the commands. The processor 1204 also computes logic and arithmetic operations related to the execution of instructions, through the ALU 1208. In addition, a plurality of process units may be implemented on a single chip or a plurality of chips.

An algorithm including codes and instructions to implement the exemplary embodiments is stored in the memory 1210 and/or storage 1212. When the algorithm is executed, the instructions are fetched from the memory 1210 or storage 1212 and processed by the processor 1204. The processor 1204 synchronizes operations based on the timing signals generated by the clock chip 1214 and executes the instructions. The embodiments described in the present disclosure may be implemented through at least one software program that is executed on at least one hardware system to perform network management functions and to control the components. The components shown in FIGS. 1, 2 and 3 may include a hardware system, a software module (s), or a combination thereof.

Figure 13:
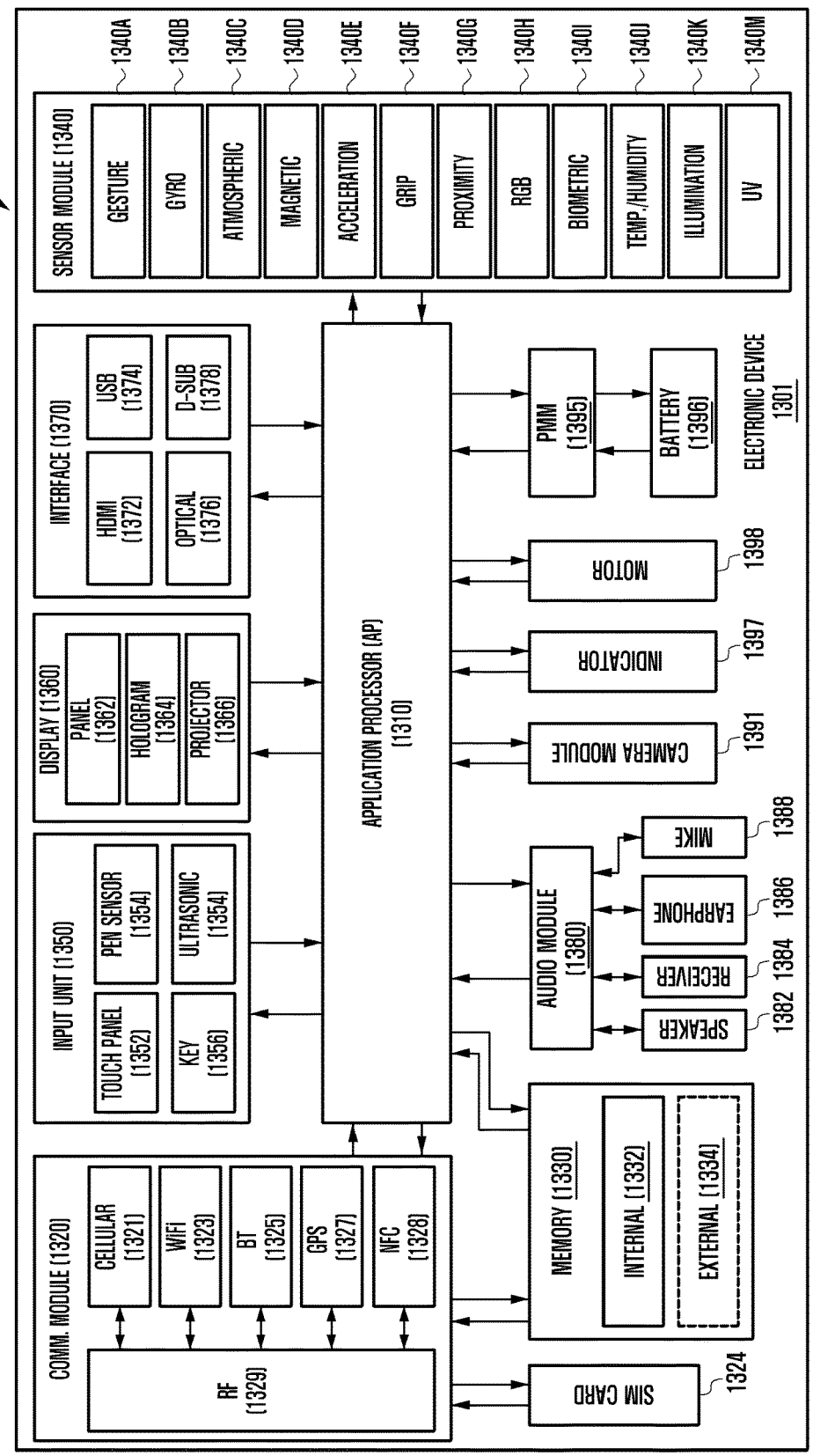
FIG. 13 is a block diagram of an electronic device according to an exemplary embodiment.

FIG. 13 is a block diagram of an electronic device 1301 according to an exemplary embodiment. The electronic device 1301 may form, for example, the whole or part of the electronic device 101 shown in FIG. 1. Referring to FIG. 13, the electronic device 1301 may include at least one application processor (AP) 1310, a communication module 1320, a subscriber identification module (SIM) card 1324, a memory 1330, a sensor module 1340, an input unit 1350, a display 1360, an interface 1370, an audio module 1380, a camera module 1391, a power management module 1395, a battery 1396, an indicator 1397, and a motor 1398.

The AP 1310 may drive an operating system or applications, control a plurality of hardware or software components connected thereto, and also perform processing and operation for various data including multimedia data. The AP 1310 may be formed of system-on-chip (SoC), for example. According to an exemplary embodiment, the AP 1310 may further include a graphic processing unit (GPU) (not shown).

The communication module 1320 (e.g., the communication interface 160) may perform a data communication with any other electronic device (e.g., the electronic device 104 or the server 106) connected to the electronic device 1300 (e.g., the electronic device 101) through the network. According to an exemplary embodiment, the communication module 1320 may include therein a cellular module 1321, a WiFi module 1323, a BT module 1325, a GPS module 1327, an NFC module 1328, and an RF (Radio Frequency) module 1329.

The cellular module 1321 may offer a voice call, a video call, a message service, an internet service, or the like through a communication network (e.g., LTE, LTE-A, CDMA, WCDMA, UMTS, WiBro, or GSM, etc.). Additionally, the cellular module 1321 may perform identification and authentication of the electronic device in the communication network, using the SIM card 1324. According to an exemplary embodiment, the cellular module 1321 may perform at least part of functions the AP 1310 can provide. For example, the cellular module 1321 may perform at least part of a multimedia control function.

According to an exemplary embodiment, the cellular module 1321 may include a communication processor (CP). Additionally, the cellular module 1321 may be formed of SoC, for example. Although some elements such as the cellular module 1321 (e.g., the CP), the memory 1330, or the power management module 1395 are shown as separate elements being different from the AP 1310 in FIG. 13, the AP 1310 may be formed to have at least part (e.g., the cellular module 1321) of the above elements in an exemplary embodiment.

According to an exemplary embodiment, the AP 1310 or the cellular module 1321 (e.g., the CP) may load commands or data, received from a nonvolatile memory connected thereto or from at least one of the other elements, into a volatile memory to process them. Additionally, the AP 1310 or the cellular module 1321 may store data, received from or created at one or more of the other elements, in the nonvolatile memory.

Each of the WiFi module 1323, the BT module 1325, the GPS module 1327 and the NFC module 1328 may include a processor for processing data transmitted or received therethrough. Although FIG. 13 shows the cellular module 1321, the WiFi module 1323, the BT module 1325, the GPS module 1327 and the NFC module 1328 as different blocks, at least part of them may be contained in a single IC (Integrated Circuit) chip or a single IC package in an exemplary embodiment. For example, at least part (e.g., the CP corresponding to the cellular module 1321 and a WiFi processor corresponding to the WiFi module 1323) of respective processors corresponding to the cellular module 1321, the WiFi module 1323, the BT module 1325, the GPS module 1327 and the NFC module 1328 may be formed as a single SoC.

The RF module 1329 may transmit and receive data, e.g., RF signals or any other electric signals. Although not shown, the RF module 1329 may include a transceiver, a PAM (Power Amp Module), a frequency filter, an LNA (Low Noise Amplifier), or the like. Also, the RF module 1329 may include any component, e.g., a wire or a conductor, for transmission of electromagnetic waves in a free air space. Although FIG. 13 shows that the cellular module 1321, the WiFi module 1323, the BT module 1325, the GPS module 1327 and the NFC module 1328 share the RF module 1329, at least one of them may perform transmission and reception of RF signals through a separate RF module in an exemplary embodiment.

The SIM card 1324_1 to 1324_N may be a card formed of SIM and may be inserted into a slot 1325_1 to 1325_N formed at a place of the electronic device. The SIM card 1324_1 to 1324_N may contain therein an ICCID (Integrated Circuit Card IDentifier) or an IMSI (International Mobile Subscriber Identity).

The memory 1330 (e.g., the memory 130) may include an internal memory 1332 and an external memory 1334. The internal memory 1332 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an exemplary embodiment, the internal memory 1332 may have the form of an SSD (Solid State Drive). The external memory 1334 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 1334 may be functionally connected to the electronic device 1300 through various interfaces. According to an exemplary embodiment, the electronic device 1300 may further include a storage device or medium such as a hard drive.

The sensor module 1340 may measure physical quantity or sense an operating status of the electronic device 1300, and then convert measured or sensed information into electric signals. The sensor module 1340 may include, for example, at least one of a gesture sensor 1340A, a gyro sensor 1340B, an atmospheric sensor 1340C, a magnetic sensor 1340D, an acceleration sensor 1340E, a grip sensor 1340F, a proximity sensor 1340G, a color sensor 1340H (e.g., RGB (Red, Green, Blue) sensor), a biometric sensor 1340I, a temperature-humidity sensor 1340J, an illumination sensor 1340K, and a UV (ultraviolet) sensor 1340M. Additionally or alternatively, the sensor module 1340 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 1340 may include a control circuit for controlling one or more sensors equipped therein.

The input unit 1350 may include a touch panel 1352, a digital pen sensor 1354, a key 1356, or an ultrasonic input unit 1358. The touch panel 1352 may recognize a touch input in a manner of capacitive type, resistive type, infrared type, or ultrasonic type. Also, the touch panel 1352 may further include a control circuit. In case of a capacitive type, a physical contact or proximity may be recognized. The touch panel 1352 may further include a tactile layer. In this case, the touch panel 1352 may offer a tactile feedback to a user.

The digital pen sensor 1354 may be formed in the same or similar manner as receiving a touch input or by using a separate recognition sheet. The key 1356 may include, for example, a physical button, an optical key, or a keypad. The ultrasonic input unit 1358 is a device capable of identifying data by sensing sound waves with a microphone 1388 in the electronic device 1300 through an input tool that generates ultrasonic signals, thus allowing wireless recognition. According to an exemplary embodiment, the electronic device 1300 may receive a user input from any external device (e.g., a computer or a server) connected thereto through the communication module 1320.

The display 1360 (e.g., the display 150) may include a panel 1362, a hologram 1364, or a projector 1366. The panel 1362 may be, for example, LCD (Liquid Crystal Display), AM-OLED (Active Matrix Organic Light Emitting Diode), or the like. The panel 1362 may have a flexible, transparent or wearable form. The panel 1362 may be formed of a single module with the touch panel 1352. The hologram 1364 may show a stereoscopic image in the air using interference of light. The projector 1366 may project an image onto a screen, which may be located at the inside or outside of the electronic device 1300. According to an exemplary embodiment, the display 1360 may further include a control circuit for controlling the panel 1362, the hologram 1364, and the projector 1366.

The interface 1370 may include, for example, an HDMI (High-Definition Multimedia Interface) 1372, a USB (Universal Serial Bus) 1374, an optical interface 1376, or a D-sub (D-subminiature) 1378. The interface 1370 may be contained, for example, in the communication interface 160 shown in FIG. 1. Additionally or alternatively, the interface 1370 may include, for example, an MHL (Mobile High-definition Link) interface, an SD (Secure Digital) card/MMC (Multi-Media Card) interface, or an IrDA (Infrared Data Association) interface.

The audio module 1380 may perform a conversion between sounds and electric signals. At least part of the audio module 1380 may be contained, for example, in the input/output interface 140 shown in FIG. 1. The audio module 1380 may process sound information inputted or outputted through a speaker 1382, a receiver 1384, an earphone 1386, or a microphone 1388.

The camera module 1391 is a device capable of obtaining still images and moving images. According to an exemplary embodiment, the camera module 1391 may include at least one image sensor (e.g., a front sensor or a rear sensor), a lens (not shown), an ISP (Image Signal Processor, not shown), or a flash (e.g., LED or xenon lamp, not shown).

The power management module 1395 may manage electric power of the electronic device 1300. Although not shown, the power management module 1395 may include, for example, a PMIC (Power Management Integrated Circuit), a charger IC, or a battery or fuel gauge.

The PMIC may be formed, for example, of an IC chip or SoC. Charging may be performed in a wired or wireless manner. The charger IC may charge a battery 1396 and prevent overvoltage or overcurrent from a charger. According to an exemplary embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 1396 and a voltage, current or temperature in a charging process. The battery 1396 may store or create electric power therein and supply electric power to the electronic device 1300. The battery 1396 may be, for example, a rechargeable battery or a solar battery.

The indicator 1397 may show thereon a current status (e.g., a booting status, a message status, or a recharging status) of the electronic device 1300 or of its part (e.g., the AP 1310). The motor 1398 may convert an electric signal into a mechanical vibration. Although not shown, the electronic device 1300 may include a processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a unit that includes one of hardware, software and firmware or any combination thereof. The module may be interchangeably used with unit, logic, logical block, component, or circuit, for example. The module may be the minimum unit, or part thereof, which performs one or more functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

According to an exemplary embodiment, the electronic device may receive webpages from information sources. The electronic device may receive content from information sources.

The electronic device may extract intent data related to at least one object contained in the webpages. The electronic device may transmit the extracted intent data to a server. The electronic device may receive, from the server, a content list including at least one content index, established based on the intent data.

According to an exemplary embodiment, the content index may be an address of web pages for at least one information source. The content list may include at least one of the following: an index number for at least one related content, a URL of the related content, a summary of the related content, the extent of semantic similarity between the related content and the content, domain metadata, metadata of the related content, and an image representing the related content. The intent data may include at least one of the following: metadata about the object, content, and context data about objects.

According to an exemplary embodiment, the metadata may include at least one of the following: creation date of content corresponding to the object, content title, author, and domain information.

According to an exemplary embodiment, the electronic device may determine a plurality of data items available from at least one object. The electronic device may perform a semantic analysis for the plurality of determined data items. The electronic device may extract the intent data related to the object, based on the semantic analysis.

According to an exemplary embodiment, the data items may include a topic, event, subject, content, word vector, token, and context information, which are related to the object.

According to an exemplary embodiment, the word vector may represent information about the probability distribution created as words related to the object are distributed with respect to at least one topic.

For example, web content (e.g., webpages) may be created with one or more topics. Each topic may be formed with a set of words. For example, respective words may have probability values for the topic. For example, when the same word is contained in a plurality of topics, the probabilities that the word is contained in the respective topics may differ from each other. For example, apple may be related to topics about fruit or health; however, the probability of apple belonging to the topic of fruit may be greater than that to health. According to an exemplary embodiment, the electronic device may perform a semantic analysis considering both a pattern of words and a pattern for the possibility of words.

According to an exemplary embodiment, the electronic device may determine whether there is content related to objects contained in webpages in display, based on the received content list. The electronic device may display objects, along with indicia indicating that there is related content, based on the determination result. The electronic device may receive a user input applied to at least one indicia displayed. The electronic device may provide content related to an object corresponding to the indicia to which the user input is applied.

According to an exemplary embodiment, the electronic device may receive, from the information sources, webpages for content semantically related to the object, and display the webpages, based on a user input.

According to an exemplary embodiment, the electronic device may provide at least one related content that is related to the object, in chronological order, based on the user input.

According to an exemplary embodiment, the electronic device (e.g., a server) may receive intent data for content from an external device (e.g., mobile device). The server may create a content list including content index for at least one related content that is related to the content, based on the received intent data. The server may transmit the created content list to the external electronic device.

According to an exemplary embodiment, the server may create the content list by indexing at least one related content in chronological order.

FIG. 14 is a flowchart of a content providing method of an electronic device according to an exemplary embodiment.

In operation 1410, the electronic device determines at least one data item related to at least one content item. For example, content may include at least one of the following: communications, documents (e.g., articles), and multi-media content. Communications may include one of the following: call records, mails, and messages. Content may be in-device content. When the electronic device creates or obtain new content, it may determine data items for the created or obtained content. For example, the electronic device may determine data items for content that is selected according to user inputs.

In operation 1420, the electronic device performs a sematic analysis for the determined data item.

In operation 1430, the electronic device extracts intent data related to the at least one content item, based on the semantic analysis.

In operation 1440, the electronic device derives the extent of semantic similarity between the extracted intent data.

In operation 1450, the electronic device determines whether the extent of semantic similarity exceeds a preset semantic threshold. When the electronic device ascertains that the extent of semantic similarity is less than or equal to the preset semantic threshold, the electronic device returns to and proceeds with operation 1410.

When the electronic device ascertains that the extent of semantic similarity exceeds the preset semantic threshold, in operation 1460, the electronic device indexes at least one content item, based on the extracted intent data.

In operation 1470, the electronic device displays user selected content and indicia indicating that there is indexed content related to the selected content. For example, when the electronic device receives a user input for selecting content in the electronic device, it may display the user selected content. When the electronic device ascertains that there is indexed content related to the selected content, the electronic device may display the indicia, along with the selected content.

In operation 1480, the electronic device determines whether a user gesture is applied to the displayed indicia. When the electronic device ascertains that the user gesture is not applied to the displayed indicia in operation 1480, the electronic device returns to and proceeds with operation 1470.

When the electronic device ascertains that a user gesture is applied to the displayed indicia in operation 1480, in operation 1490, the electronic device provide indexed content related to the displayed content based on the user applied gesture. According to an exemplary embodiment, the electronic device may provide indexed content in a mode corresponding to a type of the user gesture. For example, the electronic device may provide indexed content in chronology-based or topic-based mode. According to an exemplary embodiment, the electronic device may provide indexed content corresponding to the user gesture.

According to various exemplary embodiments, the server may continue crawling content and may create and keep indexes of the crawling content. According to an exemplary embodiment, the server may fetch content from a plurality of domains. For example, domains may be selected arbitrarily, based on a selection criterion such as URL of given seed domain, or by a content provider. The server may temporarily fetch and store content.

After loading URL, the electronic device may extract intent vector (e.g., word distributions) and metadata from content, and may transmit the extractions to the server. According to an exemplary embodiment, the electronic device may transmit URL to the server and the server may extract the intent vector and metadata.

The server may use data, obtained from client, as query characteristics, and may perform a search process in pre-computed index. The server may create a list of content containing a set of URLs arranged in chronological order, from a plurality of domains. The server may transmit the created list to the electronic device.

The electronic device may apply the list (e.g., matrix of URLs) transmitted from the server to rendered URLs, and may provide a semantic-based web browsing service.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A content providing method of an electronic device, the method comprising:
    receiving webpages from information sources;
    extracting intent data related to a first object that is being displayed and browsed by a user, among the webpages, the intent data comprising any one or any combination of metadata of the first object, first content corresponding to the first object, and context data about objects that are being displayed and browsed by the user, among the webpages;
    transmitting the intent data that is extracted, to a server;
    receiving, from the server, a content list comprising a content index that is determined based on the intent data that is transmitted;
    determining whether there is related content that is related to the objects that are displayed, among the webpages, based on the content list;
    based on the related content being determined to exist, displaying the objects along with indicia indicating that there is the related content;
    based on receiving a first input on a first index among the indicia that are displayed, providing second content related to a second object corresponding to the first index on which the first input is received, among the related content, the second content being from a first information source among the information sources; and
    based on receiving a second input on the first index among the indicia that are displayed, the second input being different than the first input, providing third content related to a third object corresponding to the first index on which the second input is received, among the related content, the third content being from a second information source different than the first information source, among the information sources.

2. The method of claim 1, wherein the content index comprises an address of the webpages for one of the information sources.

3. The method of claim 1, wherein the content list comprises any one or any combination of an index number for the related content, a URL of the related content, a summary of the related content, an extent of semantic similarity between the related content and the first content corresponding to the first object, domain metadata, metadata of the related content, and an image representing the related content.

4. The method of claim 1, wherein the metadata comprises any one or any combination of a creation date, a title, an author, and domain information of the first content.

5. The method of claim 1, wherein the extracting comprises:
    determining data items available from the first object;
    performing a semantic analysis on the data items that are determined; and
    extracting the intent data related to the first object, based on the semantic analysis that is performed.

6. The method of claim 5, wherein the data items comprise any one or any combination of a first topic, an event, a subject, the first content, a word vector, a token, and context information, which are related to the first object.

7. The method of claim 6, wherein the word vector comprises information of a probability distribution that is determined as words related to the first object are distributed with respect to one or more topics.

8. The method of claim 1, wherein the second content is later in time with respect to the objects.

9. A content providing method of an electronic device, the method comprising:
    receiving, from an external electronic device, intent data related to a first object that is being displayed and browsed by a user, among webpages, the intent data comprising any one or any combination of metadata of the first object, first content corresponding to the first object, and context data about objects that are being displayed and browsed by the user, among the webpages;
    creating a content list comprising a content index for related content that is related to the first content, based on the intent data; and
    transmitting the content list that is created, to the external electronic device,
    wherein the content list includes a content index for a second content and a content index of a third content,
    wherein the second content is related to a second object, is for being provided if a first input is received on a first index in the external electronic device, and is from a first information source, and wherein the third content is related to a third object, is for being provided if a second input different from the first input is received on the first index in the external electronic device, and is from a second information source different from the first information source.

10. The method of claim 9, wherein the content index comprises an address of the webpages for one of the information sources.

11. The method of claim 9, wherein the content list comprises any one or any combination of an index number for the related content, a URL of the related content, a summary of the related content, an extent of semantic similarity between the related content and the first content, domain metadata, metadata of the related content, and an image representing the related content.

12. The method of claim 9, wherein the creating comprises indexing the related content in chronological order.

13. An electronic device comprising:
a display;
an interface configured to receive webpages from information sources; and
a processor configured to extract intent data related to a first object that is being displayed and browsed by a user, among the webpages, the intent data comprising any one or any combination of metadata of the first object, first content corresponding to the first object, and context data about objects that are being displayed and browsed by the user, among the webpages,
wherein the interface is further configured to:
transmit the intent data that is extracted, to a server; and
receive, from the server, a content list comprising a content index that is determined based on the intent data that is transmitted, and
wherein the processor is further configured to:
determine whether there is related content that is related to the objects that are displayed, among the webpages, based on the content list;
based on the related content being determined to exist, control the display to display the objects along with indicia indicating that there is the related content;
based on a first input on a first index among the indicia that are displayed, control the display to provide second content related to a second object corresponding to the first index on which the first input is received, among the related content, the second content being from a first information source among the information sources; and
based on a second input on the first index among the indicia that are displayed, the second input being different than the first input, control the display to provide third content related to a third object corresponding to the first index on which the second input is received, among the related content, the third content being from a second information source different than the first information source, among the information sources.

14. The electronic device of claim 13, wherein the content index comprises an address of the webpages for one of the information sources.

15. The electronic device of claim 13, wherein the content list comprises any one or any combination of an index number for the related content, a URL of the related content, a summary of the related content, an extent of semantic similarity between the related content and the first content corresponding to the first object, domain metadata, metadata of the related content, and an image representing the related content.

16. The electronic device of claim 13, wherein the metadata comprises any one or any combination of a creation date, a title, an author, and domain information of the first content.

17. The electronic device of claim 13, wherein the processor is further configured to:
determine data items available from the first object;
perform a semantic analysis on the data items that are determined; and
extract the intent data related to the first object, based on the semantic analysis that is performed.

18. The electronic device of claim 17, wherein the data items comprise any one or any combination of a first topic, an event, a subject, the first content, a word vector, a token, and context information, which are related to the first object.

19. The electronic device of claim 18, wherein the word vector comprises information of a probability distribution that is determined as words related to the first object are distributed with respect to one or more topics.

20. The electronic device of claim 13, wherein the second content is later in time with respect to the objects.

21. An electronic device comprising:
an interface configured to receive, from an external electronic device, intent data related to a first object that is being displayed and browsed by a user, among webpages, the intent data comprising any one or any combination of metadata of the first object, first content corresponding to the first object, and context data about objects that are being displayed and browsed by the user, among the webpages; and
a processor configured to create a content list comprising a content index for related content that is related to the first content, based on the intent data,
wherein the interface is further configured to transmit the content list that is created, to the external electronic device,
wherein the content list includes a content index for a second content and a content index of a third content,
wherein the second content is related to a second object, is for being provided if a first input is received on a first index in the external electronic device, and is from a first information source, and
wherein the third content is related to a third object, is for being provided if a second input different from the first input is received on the first index in the external electronic device, and is from a second information source different from the first information source.

22. The electronic device of claim 21, wherein the content index comprises an address of the webpages for one of the information sources.

23. The electronic device of claim 21, wherein the content list comprises any one or any combination of an index number for the related content, a URL of the related content, a summary of the related content, an extent of semantic similarity between the related content and the first content, domain metadata, metadata of the related content, and an image representing the related content.

24. The electronic device of claim 21, wherein the processor is further configured to index the related content in chronological order.

25. A content providing method of an electronic device, the method comprising:
determining a data item related to first content that is being displayed and browsed by a user;
performing a semantic analysis on the data item;
extracting intent data related to the first content, based on the semantic analysis being performed, the intent data comprising either one or both of metadata of the first content and context data about second content that is being displayed and browsed by the user;

determining whether an extent value of semantic similarity between the intent data is greater than a threshold;

based on the extent value of semantic similarity being determined to be greater than the threshold, indexing, into a content list, the first content, based on the intent data;

determining whether there is related content that is related to the first content and the second content that are displayed, among webpages, based on the content list;

based on the related content being determined to exist, displaying the first content and the second content with indicia indicating that there is the related content;

based on a first input on a first index among the indicia that are displayed, providing third content corresponding to the first index on which the first input is received, among the related content, the third content being from a first information source; and based on a second input on the first index among the indicia that are displayed, the second input being different than the first input, providing fourth content corresponding to the first index on which the second input is received, among the related content, the fourth content being from a second information source different than the first information source.

* * * * *